(12) United States Patent
Hughes

(10) Patent No.: US 11,729,090 B2
(45) Date of Patent: Aug. 15, 2023

(54) MULTI-LEVEL LEARNING FOR CLASSIFYING NETWORK TRAFFIC FLOWS FROM FIRST PACKET DATA

(71) Applicant: HEWLETT PACKARD ENTERPRISE DEVELOPMENT LP, Houston, TX (US)

(72) Inventor: David Anthony Hughes, Los Altos Hills, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 241 days.

(21) Appl. No.: 17/107,933

(22) Filed: Nov. 30, 2020

(65) Prior Publication Data
US 2021/0083964 A1    Mar. 18, 2021

Related U.S. Application Data

(63) Continuation of application No. 15/632,008, filed on Jun. 23, 2017, now Pat. No. 10,892,978, which is a
(Continued)

(51) Int. Cl.
*H04L 45/12* (2022.01)
*H04L 47/2441* (2022.01)
(Continued)

(52) U.S. Cl.
CPC .............. *H04L 45/12* (2013.01); *H04L 45/08* (2013.01); *H04L 45/306* (2013.01); *H04L 45/54* (2013.01);
(Continued)

(58) Field of Classification Search
CPC ....... H04L 45/12; H04L 45/08; H04L 45/306; H04L 45/54; H04L 45/72; H04L 45/745; H04L 47/2441
See application file for complete search history.

(56) References Cited

U.S. PATENT DOCUMENTS

| 4,494,108 A | 1/1985 | Langdon et al. |
| 4,558,302 A | 12/1985 | Welch |

(Continued)

FOREIGN PATENT DOCUMENTS

| EP | 1507353 A2 | 2/2005 |
| JP | 05-061964 A | 3/1993 |
| WO | 01/35226 A1 | 5/2001 |

OTHER PUBLICATIONS

Non-Final Office Action, dated Aug. 11, 2015, U.S. Appl. No. 14/677,841, filed Apr. 2, 2015.
(Continued)

*Primary Examiner* — Ajit Patel
*Assistant Examiner* — Wilfred Thomas
(74) *Attorney, Agent, or Firm* — Sheppard Mullin Richter & Hampton LLP

(57) ABSTRACT

Disclosed herein are systems and methods for multi-level classification of data traffic flows based on information in a first data packet for a data traffic flow. In exemplary embodiments of the present disclosure, a key can be generated to track data traffic flows by application names and data packet information or properties. Based on these keys, patterns can be discerned to infer data traffic information based on only the information in a first data packet. The determined patterns can be used to predict classifications of future traffic flows with similar key information. In this way, data traffic flows can be classified and steered in a network based on limited information available in a first data packet.

18 Claims, 14 Drawing Sheets destination IP/min(destination port, source port) "Application name" count

Related U.S. Application Data continuation-in-part of application No. 15/425,798, filed on Feb. 6, 2017, now Pat. No. 10,257,082.

(51) Int. Cl.
  *H04L 45/302* (2022.01)
  *H04L 45/00* (2022.01)
  *H04L 45/02* (2022.01)
  *H04L 45/745* (2022.01)

(52) U.S. Cl.
  CPC ............ *H04L 45/72* (2013.01); *H04L 45/745* (2013.01); *H04L 47/2441* (2013.01)

(56) References Cited

U.S. PATENT DOCUMENTS

| | | |
|---|---|---|
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Libove et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,823,470 B2 | 11/2004 | Smith et al. |
| 6,839,346 B1 | 1/2005 | Kametani |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Securest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagarajan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van et al. |
| 7,243,094 B2 | 7/2007 | Tabellion et al. |
| 7,249,309 B2 | 7/2007 | Glaise et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,441,039 B2 | 10/2008 | Bhardwaj |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 | 2/2009 | Coverdill et al. |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |

(56) References Cited

U.S. PATENT DOCUMENTS

| | | |
|---|---|---|
| 7,764,606 B1 | 7/2010 | Ferguson et al. |
| 7,793,193 B2 | 9/2010 | Koch et al. |
| 7,810,155 B1 | 10/2010 | Ravi |
| 7,826,798 B2 | 11/2010 | Stephens et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,924,795 B2 | 4/2011 | Wan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,957,307 B2 | 6/2011 | Qiu et al. |
| 7,970,898 B2 | 6/2011 | Clubb et al. |
| 7,975,018 B2 | 7/2011 | Unrau et al. |
| 7,996,747 B2 | 8/2011 | Dell et al. |
| 8,046,667 B2 | 10/2011 | Boyce |
| 8,069,225 B2 | 11/2011 | Mccanne et al. |
| 8,072,985 B2 | 12/2011 | Golan et al. |
| 8,090,027 B2 | 1/2012 | Schneider |
| 8,090,805 B1 | 1/2012 | Chawla et al. |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,553,757 B2 | 10/2013 | Florencio et al. |
| 8,565,118 B2 | 10/2013 | Shukla et al. |
| 8,570,869 B2 | 10/2013 | Ojala et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | Mccanne et al. |
| 8,699,490 B2 | 4/2014 | Zheng et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 8,998,544 B1 | 4/2015 | Higgins |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 | 8/2015 | Wang |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B2 | 4/2017 | Hughes |
| 9,626,224 B2 | 4/2017 | Hughes et al. |
| 9,647,949 B2 | 5/2017 | Varki et al. |
| 9,712,463 B1 | 7/2017 | Hughes et al. |
| 9,716,644 B2 | 7/2017 | Wei et al. |
| 9,717,021 B2 | 7/2017 | Hughes et al. |
| 9,875,344 B1 | 1/2018 | Hughes et al. |
| 9,906,452 B1 | 2/2018 | Dosovitsky et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,038,616 B2 | 7/2018 | Talat et al. |
| 10,091,172 B1 | 10/2018 | Hughes |
| 10,164,861 B2 | 12/2018 | Hughes et al. |
| 10,198,499 B1 * | 2/2019 | McNair ................ G06F 16/288 |
| 10,257,082 B2 | 4/2019 | Hughes |
| 10,313,930 B2 | 6/2019 | Hughes et al. |
| 10,326,551 B2 | 6/2019 | Hughes |
| 10,432,484 B2 | 10/2019 | Hughes et al. |
| 10,601,848 B1 | 3/2020 | Jeyaraman et al. |
| 10,637,721 B2 | 4/2020 | Hughes et al. |
| 10,705,695 B1 * | 7/2020 | Porath ................ G06F 3/0486 |
| 10,719,588 B2 | 7/2020 | Hughes et al. |
| 10,771,370 B2 | 9/2020 | Hughes et al. |
| 10,771,394 B2 | 9/2020 | Hughes |
| 10,805,840 B2 | 10/2020 | Hughes et al. |
| 10,812,361 B2 | 10/2020 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 | 1/2002 | Jungck et al. |
| 2002/0010702 A1 | 1/2002 | Ajtai et al. |
| 2002/0010765 A1 | 1/2002 | Border |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0048785 A1 | 3/2003 | Calvignac et al. |
| 2003/0067940 A1 | 4/2003 | Edholm |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |

(56) References Cited

U.S. PATENT DOCUMENTS

| | | |
|---|---|---|
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0192992 A1* | 9/2005 | Reed .................. G06Q 10/107 |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Securest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | DuRee |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1 | 5/2006 | Malamal et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | Van et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1 | 4/2007 | Kolakowski et al. |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De et al. |
| 2007/0160200 A1 | 7/2007 | Ishikawa et al. |
| 2007/0174428 A1 | 7/2007 | Lev et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1 | 11/2007 | Mirtorabi et al. |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0285463 A1 | 11/2008 | Oran |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar et al. |
| 2009/0175172 A1 | 7/2009 | Prytz et al. |
| 2009/0182864 A1 | 7/2009 | Khan et al. |
| 2009/0204961 A1 | 8/2009 | Dehaan et al. |
| 2009/0234966 A1 | 9/2009 | Samuels et al. |
| 2009/0245114 A1 | 10/2009 | Jayanth |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |

(56) References Cited

U.S. PATENT DOCUMENTS

| | | |
|---|---|---|
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | Van et al. |
| 2011/0113472 A1 | 5/2011 | Fung et al. |
| 2011/0131411 A1 | 6/2011 | Lin et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0182183 A1* | 7/2011 | Perkins ............... H04L 61/4511 370/235 |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0005549 A1 | 1/2012 | Ichiki et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | Decusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0101043 A1* | 4/2015 | Clifton ................... H04L 67/14 726/22 |
| 2015/0110113 A1 | 4/2015 | Levy et al. |
| 2015/0120663 A1 | 4/2015 | Le et al. |
| 2015/0127701 A1 | 5/2015 | Chu et al. |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0050456 A1* | 2/2016 | Arini ............... H04N 21/44204 725/10 |
| 2016/0093193 A1 | 3/2016 | Silvers et al. |
| 2016/0112255 A1 | 4/2016 | Li |
| 2016/0142310 A1 | 5/2016 | Means |
| 2016/0218947 A1 | 7/2016 | Hughes et al. |
| 2016/0234167 A1* | 8/2016 | Engel ................. H04L 63/1408 |
| 2016/0255000 A1 | 9/2016 | Gattani et al. |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0006335 A1* | 1/2017 | Patel ..................... H04N 21/812 |
| 2017/0026467 A1 | 1/2017 | Barsness et al. |
| 2017/0111692 A1 | 4/2017 | An et al. |
| 2017/0126564 A1* | 5/2017 | Mayya .................. H04L 43/028 |
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0018508 A1* | 1/2018 | Tusch .................... G06V 40/20 |
| 2018/0027416 A1 | 1/2018 | Bickford et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131593 A1* | 5/2018 | Jain .......................... H04L 12/66 |
| 2018/0131711 A1 | 5/2018 | Chen et al. |
| 2018/0150377 A1* | 5/2018 | Oberle ................ G06F 11/3604 |
| 2018/0167365 A1 | 6/2018 | Zarcone ................. H04L 69/22 |
| 2018/0205494 A1 | 7/2018 | Hughes |
| 2018/0227216 A1 | 8/2018 | Hughes |
| 2018/0227223 A1 | 8/2018 | Hughes |
| 2019/0036908 A1* | 1/2019 | Liu ......................... H04W 12/03 |
| 2019/0089620 A1 | 3/2019 | Hefel et al. |
| 2019/0094175 A1* | 3/2019 | Merriman ............... B82Y 15/00 |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0213185 A1 | 7/2020 | Hughes et al. |
| 2020/0258118 A1 | 8/2020 | Kovvali et al. |
| 2020/0279029 A1 | 9/2020 | Hughes et al. |
| 2020/0358687 A1 | 11/2020 | Hughes et al. |

OTHER PUBLICATIONS

Non-Final Office Action, dated Aug. 12, 2010, U.S. Appl. No. 12/313,618, filed Nov. 20, 2008.

Non-Final Office Action, dated Aug. 14, 2013, U.S. Appl. No. 12/217,440, filed Jul. 3, 2008.

Non-Final Office Action, dated Aug. 14, 2013, U.S. Appl. No. 13/917,517, filed Jun. 13, 2013.

(56) References Cited

OTHER PUBLICATIONS

Non-Final Office Action, dated Aug. 18, 2015, U.S. Appl. No. 14/543,781, filed Nov. 17, 2014.
Non-Final Office Action, dated Aug. 24, 2007, U.S. Appl. No. 11/202,697, filed Aug. 12, 2005.
Non-Final Office Action, dated Aug. 24, 2007, U.S. Appl. No. 11/240,110, filed Sep. 29, 2005.
Non-Final Office Action, dated Aug. 24, 2007, U.S. Appl. No. 11/497,026, filed Jul. 31, 2006.
Non-Final Office Action, dated Aug. 26, 2016, U.S. Appl. No. 13/621,534, filed Sep. 17, 2012.
Non-Final Office Action, dated Aug. 28, 2012, U.S. Appl. No. 12/070,796, filed Feb. 20, 2008.
Non-Final Office Action, dated Dec. 1, 2011, U.S. Appl. No. 11/998,726, filed Nov. 30, 2007.
Non-Final Office Action, dated Dec. 15, 2015, U.S. Appl. No. 14/479,131, filed Sep. 5, 2014.
Non-Final Office Action, dated Dec. 16, 2015, U.S. Appl. No. 14/859,179, filed Sep. 18, 2015.
Non-Final Office Action, dated Dec. 20, 2011, U.S. Appl. No. 11/498,473, filed Aug. 2, 2006.
Non-Final Office Action, dated Dec. 30, 2011, U.S. Appl. No. 11/825,440, filed Jul. 5, 2007.
Non-Final Office Action, dated Dec. 31, 2014, U.S. Appl. No. 13/621,534, filed Sep. 17, 2012.
Non-Final Office Action, dated Dec. 6, 2010, U.S. Appl. No. 11/498,473, filed Aug. 2, 2006.
Non-Final Office Action, dated Dec. 9, 2009, U.S. Appl. No. 11/825,497, filed Jul. 5, 2007.
Non-Final Office Action, dated Feb. 2, 2010, U.S. Appl. No. 11/498,491, filed Aug. 2, 2006.
Non-Final Office Action, dated Feb. 3, 2010, U.S. Appl. No. 11/998,726, filed Nov. 30, 2007.
Non-Final Office Action, dated Feb. 3, 2011, U.S. Appl. No. 12/151,839, filed May 8, 2008.
Non-Final Office Action, dated Feb. 4, 2010, U.S. Appl. No. 12/070,796, filed Feb. 20, 2008.
Non-Final Office Action, dated Jan. 12, 2016, U.S. Appl. No. 14/477,804, filed Sep. 4, 2014.
Non-Final Office Action, dated Jan. 22, 2009, U.S. Appl. No. 11/498,473, filed Aug. 2, 2006.
Non-Final Office Action, dated Jan. 23, 2015, U.S. Appl. No. 14/548,195, filed Nov. 19, 2014.
Non-Final Office Action, dated Jan. 26, 2009, U.S. Appl. No. 11/498,491, filed Aug. 2, 2006.
Non-Final Office Action, dated Jan. 26, 2010, U.S. Appl. No. 11/903,416, filed Sep. 20, 2007.
Non-Final Office Action, dated Jan. 3, 2013, U.S. Appl. No. 13/482,321, filed May 29, 2012.
Non-Final Office Action, dated Jan. 4, 2011, U.S. Appl. No. 11/498,491, filed Aug. 2, 2006.
Non-Final Office Action, dated Jan. 6, 2010, U.S. Appl. No. 12/217,440, filed Jul. 3, 2008.
Non-Final Office Action, dated Jul. 1, 2013, U.S. Appl. No. 12/313,618, filed Nov. 20, 2008.
Non-Final Office Action, dated Jul. 10, 2008, U.S. Appl. No. 11/240,110, filed Sep. 29, 2005.
Non-Final Office Action, dated Jul. 10, 2013, U.S. Appl. No. 11/498,473, filed Aug. 2, 2006.
Non-Final Office Action, dated Jul. 11, 2014, U.S. Appl. No. 14/248,188, filed Apr. 8, 2014.
Non-Final Office Action, dated Jul. 15, 2015, U.S. Appl. No. 14/734,949, filed Jun. 9, 2015.
Non-Final Office Action, dated Jul. 17, 2008, U.S. Appl. No. 11/202,697, filed Aug. 12, 2005.
Non-Final Office Action, dated Jul. 18, 2011, U.S. Appl. No. 11/285,816, filed Nov. 22, 2005.
Non-Final Office Action, dated Jul. 18, 2012, U.S. Appl. No. 12/217,440, filed Jul. 3, 2008.
Non-Final Office Action, dated Jul. 21, 2010, U.S. Appl. No. 12/070,796, filed Feb. 20, 2008.
Non-Final Office Action, dated Jul. 25, 2016, U.S. Appl. No. 14/067,619, filed Oct. 30, 2013.
Non-Final Office Action, dated Jul. 27, 2017, U.S. Appl. No. 14/981,814, filed Dec. 28, 2015.
Non-Final Office Action, dated Jul. 30, 2014, U.S. Appl. No. 13/274,162, filed Oct. 14, 2011.
Non-Final Office Action, dated Jul. 5, 2012, U.S. Appl. No. 13/427,422, filed Mar. 22, 2012.
Non-Final Office Action, dated Jul. 7, 2011, U.S. Appl. No. 12/070,796, filed Feb. 20, 2008.
Non-Final Office Action, dated Jul. 8, 2008, U.S. Appl. No. 11/497,026, filed Jul. 31, 2006.
Non-Final Office Action, dated Jun. 13, 2014, U.S. Appl. No. 13/288,691, filed Nov. 3, 2011.
Non-Final Office Action, dated Jun. 14, 2010, U.S. Appl. No. 12/151,839, filed May 8, 2008.
Non-Final Office Action, dated Jun. 15, 2016, U.S. Appl. No. 15/091,533, filed Apr. 5, 2016.
Non-Final Office Action, dated Jun. 17, 2010, U.S. Appl. No. 12/622,324, filed Nov. 19, 2009.
Non-Final Office Action, dated Jun. 18, 2010, U.S. Appl. No. 11/825,497, filed Jul. 5, 2007.
Non-Final Office Action, dated Jun. 2, 2015, U.S. Appl. No. 13/288,691, filed Nov. 3, 2011.
Non-Final Office Action, dated Jun. 20, 2017, U.S. Appl. No. 15/148,933, filed May 6, 2016.
Non-Final Office Action, dated Jun. 22, 2009, U.S. Appl. No. 11/796,239, filed Apr. 27, 2007.
Non-Final Office Action, dated Jun. 22, 2016, U.S. Appl. No. 14/447,505, filed Jul. 30, 2014.
Non-Final Office Action, dated Jun. 6, 2014, U.S. Appl. No. 14/190,940, filed Feb. 26, 2014.
Non-Final Office Action, dated Jun. 8, 2015, U.S. Appl. No. 14/248,167, filed Apr. 8, 2014.
Non-Final Office Action, dated Mar. 11, 2015, U.S. Appl. No. 14/549,425, filed Nov. 20, 2014.
Non-Final Office Action, dated Mar. 22, 2010, U.S. Appl. No. 11/285,816, filed Nov. 22, 2005.
Non-Final Office Action, dated Mar. 24, 2009, U.S. Appl. No. 11/285,816, filed Nov. 22, 2005.
Non-Final Office Action, dated Mar. 8, 2011, U.S. Appl. No. 12/313,618, filed Nov. 20, 2008.
Non-Final Office Action, dated May 13, 2011, U.S. Appl. No. 11/825,440, filed Jul. 5, 2007.
Non-Final Office Action, dated May 18, 2015, U.S. Appl. No. 14/679,965, filed Apr. 6, 2015.
Non-Final Office Action, dated May 20, 2013, U.S. Appl. No. 13/288,691, filed Nov. 3, 2011.
Non-Final Office Action, dated May 24, 2010, U.S. Appl. No. 11/825,440, filed Jul. 5, 2007.
Non-Final Office Action, dated May 3, 2016, U.S. Appl. No. 14/679,965, filed Apr. 6, 2015.
Non-Final Office Action, dated May 4, 2017, U.S. Appl. No. 14/811,482, filed Jul. 28, 2015.
Non-Final Office Action, dated May 6, 2015, U.S. Appl. No. 14/477,804, filed Sep. 4, 2014.
Non-Final Office Action, dated May 6, 2016, U.S. Appl. No. 13/288,691, filed Nov. 3, 2011.
Non-Final Office Action, dated Nov. 17, 2008, U.S. Appl. No. 11/263,755, filed Oct. 31, 2005.
Non-Final Office Action, dated Nov. 2, 2017, U.S. Appl. No. 15/403,116, filed Jan. 10, 2017.
Non-Final Office Action, dated Nov. 26, 2014, U.S. Appl. No. 14/333,486, filed Jul. 16, 2014.
Non-Final Office Action, dated Nov. 6, 2012, U.S. Appl. No. 11/998,726, filed Nov. 30, 2007.
Non-Final Office Action, dated Oct. 1, 2014, U.S. Appl. No. 14/190,940, filed Feb. 26, 2014.
Non-Final Office Action, dated Oct. 13, 2010, U.S. Appl. No. 11/285,816, filed Nov. 22, 2005.

(56) References Cited

OTHER PUBLICATIONS

Non-Final Office Action, dated Oct. 20, 2009, U.S. Appl. No. 11/285,816, filed Nov. 22, 2005.
Non-Final Office Action, dated Oct. 22, 2013, U.S. Appl. No. 13/274,162, filed Oct. 14, 2011.
Non-Final Office Action, dated Oct. 4, 2011, U.S. Appl. No. 12/313,618, filed Nov. 20, 2008.
Non-Final Office Action, dated Oct. 6, 2016, U.S. Appl. No. 14/479,131, filed Sep. 5, 2014.
Non-Final Office Action, dated Oct. 7, 2010, U.S. Appl. No. 12/217,440, filed Jul. 3, 2008.
Non-Final Office Action, dated Oct. 9, 2013, U.S. Appl. No. 11/498,491, filed Aug. 2, 2006.
Non-Final Office Action, dated Sep. 10, 2013, U.S. Appl. No. 13/757,548, filed Feb. 1, 2013.
Non-Final Office Action, dated Sep. 11, 2017, U.S. Appl. No. 15/148,671, filed May 6, 2016.
Non-Final Office Action, dated Sep. 13, 2012, U.S. Appl. No. 11/498,473, filed Aug. 2, 2006.
Non-Final Office Action, dated Sep. 17, 2008, U.S. Appl. No. 11/357,657, filed Feb. 16, 2006.
Non-Final Office Action, dated Sep. 20, 2012, U.S. Appl. No. 13/517,575, filed Jun. 13, 2012.
Non-Final Office Action, dated Sep. 22, 2011, U.S. Appl. No. 12/217,440, filed Jul. 3, 2008.
Non-Final Office Action, dated Sep. 25, 2012, U.S. Appl. No. 11/498,491, filed Aug. 2, 2006.
Non-Final Office Action, dated Sep. 26, 2008, U.S. Appl. No. 11/285,816, filed Nov. 22, 2005.
Non-Final Office Action, dated Sep. 27, 2011, U.S. Appl. No. 13/112,936, filed May 20, 2011.
Notice of Allowance, dated Apr. 14, 2014, U.S. Appl. No. 12/313,618, filed Nov. 20, 2008.
Notice of Allowance, dated Apr. 21, 2011, U.S. Appl. No. 11/825,497, filed Jul. 5, 2007.
Notice of Allowance, dated Apr. 28, 2009, U.S. Appl. No. 11/357,657, filed Feb. 16, 2006.
Notice of Allowance, dated Aug. 24, 2016, U.S. Appl. No. 14/679,965, filed Apr. 6, 2015.
Notice of Allowance, dated Aug. 30, 2012, U.S. Appl. No. 11/240,110, filed Sep. 29, 2005.
Notice of Allowance, dated Aug. 31, 2009, U.S. Appl. No. 11/724,800, filed Mar. 15, 2007.
Notice of Allowance, dated Dec. 22, 2014, U.S. Appl. No. 14/333,486, filed Jul. 16, 2014.
Notice of Allowance, dated Dec. 26, 2012, U.S. Appl. No. 11/497,026, filed Jul. 31, 2006.
Notice of Allowance, dated Dec. 3, 2009, U.S. Appl. No. 11/796,239, filed Apr. 27, 2007.
Notice of Allowance, dated Dec. 5, 2016, U.S. Appl. No. 14/477,804, filed Sep. 4, 2014.
Notice of Allowance, dated Dec. 9, 2010, U.S. Appl. No. 12/622,324, filed Nov. 19, 2009.
Tseng, Josh, "When accelerating secure traffic is not secure" (available at http://www.riverbed.com/blogs/whenaccelerati.html?&isSearch=true&pageS- ize=3&page=2 (last visited Aug. 8, 2014)), 3 pages.
You et al., "Deep Store An Archival Storage System Architecture" Proceedings of the 21st International Conference on Data Engineering (ICDE 2005), May 2005, 12 pages.
You, L. L. and Karamanolis, C. 2004. "Evaluation of efficient archival storage techniques", In Proceedings of the 21st IEEE Symposium on Mass Storage Systems and Technologies (MSST), pp. 1-6.
You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.
Definition appliance, 2c, Webster's Third New International Dictionary, Unabridged (1993), available at <http://lionreference.chadwyck.com> (Dictionaries/Websters Dictionary).
Final Office Action, dated Feb. 3, 2011, U.S. Appl. No. 12/217,440, filed Jul. 3, 2008.
Final Office Action, dated Feb. 4, 2013, U.S. Appl. No. 11/498,473, filed Aug. 2, 2006.
Final Office Action, dated Jan. 11, 2013, U.S. Appl. No. 13/517,575, filed Jun. 13, 2012.
Final Office Action, dated Jan. 11, 2016, U.S. Appl. No. 13/288,691, filed Nov. 3, 2011.
Final Office Action, dated Jan. 12, 2009, U.S. Appl. No. 11/202,697, filed Aug. 12, 2005.
Final Office Action, dated Jan. 12, 2015, U.S. Appl. No. 13/274,162, filed Oct. 14, 2011.
Final Office Action, dated Jan. 14, 2014, U.S. Appl. No. 12/313,618, filed Nov. 20, 2008.
Final Office Action, dated Jan. 22, 2008, U.S. Appl. No. 11/240,110, filed Sep. 29, 2005.
Final Office Action, dated Jan. 5, 2009, U.S. Appl. No. 11/240,110, filed Sep. 29, 2005.
Final Office Action, dated Jan. 9, 2008, U.S. Appl. No. 11/497,026, filed Jul. 31, 2006.
Final Office Action, dated Jul. 13, 2010, U.S. Appl. No. 11/498,491, filed Aug. 2, 2006.
Final Office Action, dated Jul. 14, 2015, U.S. Appl. No. 13/621,534, filed Sep. 17, 2012.
Final Office Action, dated Jul. 17, 2013, U.S. Appl. No. 13/427,422, filed Mar. 22, 2012.
Final Office Action, dated Jul. 19, 2016, U.S. Appl. No. 14/479,131, filed Sep. 5, 2014.
Final Office Action, dated Jul. 22, 2010, U.S. Appl. No. 11/998,726, filed Nov. 30, 2007.
Final Office Action, dated Jul. 26, 2016, U.S. Appl. No. 14/477,804, filed Sep. 4, 2014.
Final Office Action, dated Mar. 16, 2012, U.S. Appl. No. 11/498,473, filed Aug. 2, 2006.
Final Office Action, dated Mar. 25, 2014, U.S. Appl. No. 11/498,491, filed Aug. 2, 2006.
Final Office Action, dated Mar. 30, 2011, U.S. Appl. No. 11/285,816, filed Nov. 22, 2005.
Final Office Action, dated May 11, 2009, U.S. Appl. No. 11/263,755, filed Oct. 31, 2005.
Final Office Action, dated May 14, 2010, U.S. Appl. No. 12/217,440, filed Jul. 3, 2008.
Final Office Action, dated May 25, 2012, U.S. Appl. No. 12/313,618, filed Nov. 20, 2008.
Final Office Action, dated May 3, 2017, U.S. Appl. No. 14/479,131, filed Sep. 5, 2014.
Final Office Action, dated May 5, 2010, U.S. Appl. No. 11/903,416, filed Sep. 20, 2007.
Final Office Action, dated Nov. 2, 2012, U.S. Appl. No. 13/427,422, filed Mar. 22, 2012.
Final Office Action, dated Nov. 20, 2012, U.S. Appl. No. 12/217,440, filed Jul. 3, 2008.
Final Office Action, dated Nov. 21, 2016, U.S. Appl. No. 14/447,505, filed Jul. 30, 2015.
Final Office Action, dated Nov. 4, 2010, U.S. Appl. No. 11/825,497, filed Jul. 5, 2007.
Final Office Action, dated Nov. 9, 2010, U.S. Appl. No. 11/998,726, filed Nov. 30, 2007.
Final Office Action, dated Oct. 12, 2010, U.S. Appl. No. 11/825,440, filed Jul. 5, 2007.
Final Office Action, dated Oct. 12, 2011, U.S. Appl. No. 12/151,839, filed May 8, 2008.
Final Office Action, dated Oct. 13, 2011, U.S. Appl. No. 11/998,726, filed Nov. 30, 2007.
Final Office Action, dated Oct. 4, 2016, U.S. Appl. No. 15/091,533, filed Apr. 5, 2016.
Final Office Action, dated Oct. 5, 2017, U.S. Appl. No. 15/148,933, filed May 6, 2016.
Final Office Action, dated Sep. 1, 2009, U.S. Appl. No. 11/498,491, filed Aug. 2, 2006.
Final Office Action, dated Sep. 18, 2015, U.S. Appl. No. 14/477,804, filed Sep. 4, 2014.

(56) References Cited

OTHER PUBLICATIONS

Final Office Action, dated Sep. 23, 2010, U.S. Appl. No. 12/151,839, filed May 8, 2008.
Final Office Action, dated Sep. 26, 2013, U.S. Appl. No. 13/288,691, filed Nov. 3, 2011.
Final Office Action, dated Sep. 30, 2011, U.S. Appl. No. 11/825,440, filed Jul. 5, 2007.
Final Written Decision, dated Dec. 30, 2014, Inter Partes Review Case No. IPR2013-00402, pp. 1-37.
Final Written Decision, dated Dec. 30, 2014, Inter Partes Review Case No. IPR2013-00403, pp. 1-38.
Final Written Decision, dated Jun. 9, 2015, Inter Partes Review Case No. IPR2014-00245, pp. 1-40.
Josh Tseng, "When accelerating secure traffic is not secure," available online at <http://www.riverbed.com/blogs/whenaccelerati.html?&isSearch=true&pageSize=3&page=2>, Aug. 27, 2008, 3 pages.
Knutsson, Bjorn et al., "Transparent Proxy Signalling", Journal of Communications and Networks, vol. 3, No. 2, Jun. 2001, pp. 164-174.
Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.
Muthitacharoen, Athicha et al., "A Low-bandwidth Network File System," 2001, in Proc. of the 18th ACM Symposium on Operating Systems Principles, Banff, Canada, pp. 174-187.
Newton, "Newton's Telecom Dictionary", 17th Ed., 2001, pp. 38, 201, and 714.
Non-Final Office Action, dated Apr. 2, 2013, U.S. Appl. No. 13/427,422, filed Mar. 22, 2012.
Non-Final Office Action, dated Apr. 27, 2017, U.S. Appl. No. 14/447,505, filed Jul. 30, 2014.
Non-Final Office Action, dated Aug. 10, 2016, U.S. Appl. No. 15/148,933, filed May 6, 2016.
Notice of Allowance, dated Feb. 11, 2011, U.S. Appl. No. 11/903,416, filed Sep. 20, 2007.
Notice of Allowance, dated Feb. 14, 2014, U.S. Appl. No. 11/498,473, filed Aug. 2, 2006.
Notice of Allowance, dated Feb. 16, 2016, U.S. Appl. No. 14/248,167, filed Apr. 8, 2014.
Notice of Allowance, dated Feb. 19, 2013, U.S. Appl. No. 13/482,321, filed May 29, 2012.
Notice of Allowance, dated Feb. 29, 2012, U.S. Appl. No. 11/825,440, filed Jul. 5, 2007.
Notice of Allowance, dated Feb. 8, 2016, U.S. Appl. No. 14/543,781, filed Nov. 17, 2014.
Notice of Allowance, dated Jan. 16, 2014, U.S. Appl. No. 12/217,440, filed Jul. 3, 2008.
Notice of Allowance, dated Jan. 2, 2014, U.S. Appl. No. 13/427,422, filed Mar. 22, 2012.
Notice of Allowance, dated Jan. 20, 2011, U.S. Appl. No. 12/622,324, filed Nov. 19, 2009.
Notice of Allowance, dated Jan. 23, 2015, U.S. Appl. No. 14/248,188, filed Apr. 8, 2014.
Notice of Allowance, dated Jan. 3, 2014, U.S. Appl. No. 13/757,548, filed Feb. 1, 2013.
Notice of Allowance, dated Jul. 27, 2015, U.S. Appl. No. 14/549,425, filed Nov. 20, 2014.
Notice of Allowance, dated Jun. 10, 2014, U.S. Appl. No. 11/498,491, filed Aug. 2, 2006.
Notice of Allowance, dated Jun. 3, 2015, U.S. Appl. No. 14/548,195, filed Nov. 19, 2014.
Notice of Allowance, dated Jun. 3, 2016, U.S. Appl. No. 14/859,179, filed Sep. 18, 2015.
Notice of Allowance, dated Mar. 16, 2012, U.S. Appl. No. 12/151,839, filed May 8, 2008.
Notice of Allowance, dated Mar. 16, 2015, U.S. Appl. No. 14/190,940, filed Feb. 26, 2014.
Notice of Allowance, dated Mar. 2, 2016, U.S. Appl. No. 14/677,841, filed Apr. 2, 2015.
Notice of Allowance, dated Mar. 21, 2013, U.S. Appl. No. 12/070,796, filed Feb. 20, 2008.
Notice of Allowance, dated Mar. 22, 2017, U.S. Appl. No. 13/621,534, filed Sep. 17, 2012.
Notice of Allowance, dated Mar. 23, 2017, U.S. Appl. No. 15/091,533, filed Apr. 5, 2016.
Notice of Allowance, dated Mar. 26, 2012, U.S. Appl. No. 13/112,936, filed May 20, 2011.
Notice of Allowance, dated May 14, 2013, U.S. Appl. No. 11/998,726, filed Nov. 30, 2007.
Notice of Allowance, dated May 21, 2015, U.S. Appl. No. 13/274,162, filed Oct. 14, 2011.
Notice of Allowance, dated Nov. 12, 2011, U.S. Appl. No. 11/825,497, filed Jul. 5, 2007.
Notice of Allowance, dated Nov. 16, 2016, U.S. Appl. No. 13/288,691, filed Nov. 3, 2011.
Notice of Allowance, dated Nov. 23, 2016, U.S. Appl. No. 14/067,619, filed Oct. 30, 2013.
Notice of Allowance, dated Nov. 25, 2013, U.S. Appl. No. 13/917,517, filed Jun. 13, 2013.
Notice of Allowance, dated Oct. 23, 2012, U.S. Appl. No. 11/202,697, filed Aug. 12, 2005.
Notice of Allowance, dated Oct. 25, 2017, U.S. Appl. No. 14/447,505, filed Jul. 30, 2014.
Notice of Allowance, dated Oct. 5, 2015, U.S. Appl. No. 14/734,949, filed Jun. 9, 2015.
Notice of Allowance, dated Oct. 6, 2014, U.S. Appl. No. 14/270,101, filed May 5, 2014.
Notice of Allowance, dated Sep. 12, 2014, U.S. Appl. No. 13/657,733, filed Oct. 22, 2012.
Notice of Allowance, dated Sep. 26, 2013, U.S. Appl. No. 13/517,575, filed Jun. 13, 2012.
Notice of Allowance, dated Sep. 5, 2014, U.S. Appl. No. 14/248,229, filed Apr. 8, 2014.
Notice of Allowance, dated Sep. 5, 2017, U.S. Appl. No. 14/811,482, filed Jul. 28, 2015.
Notice of Allowance, dated Sep. 8, 2009, U.S. Appl. No. 11/263,755, filed Oct. 31, 2005.
Notice of Allowance, dated Sep. 8, 2017, U.S. Appl. No. 14/479,131, filed Sep. 5, 2014.
Request for Trial Granted, dated Jan. 2, 2014, U.S. Appl. No. 11/202,697, filed Aug. 12, 2005.
Request for Trial Granted, dated Jan. 2, 2014, U.S. Appl. No. 11/240,110, filed Sep. 29, 2005.
Request for Trial Granted, dated Jun. 11, 2014, U.S. Appl. No. 11/497,026, filed Jul. 31, 2006.
Riverbed Technology, "Riverbed Awarded Patent on Core WDS Technology," Nov. 13, 2006, 2 pages.
Riverbed Technology, "Riverbed Introduces Market-Leading WDS Solutions for Disaster Recovery and Business Application Acceleration," Oct. 22, 2007, 4 pages.
Riverbed Technology, "The Riverbed Optimization System (RiOS) v4.0: A Technical Overview," White Paper, 2007, pp. 1-18.
Riverbed, "Riverbed Introduces Market-Leading WDS Solutions for Disaster Recovery and Business Application Acceleration" (available at http://www.riverbed.com/about/news-articles/pressreleases/riverbed-introd-uces-market-leading-wds-solutions-fordisaster-recovery-and-business-applic- ation-acceleration.html (last visited Aug. 8, 2014)), 4 pages.
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)), pp. 1-18.
Silver Peak Systems, "The Benefits of Byte-level WAN Deduplication" (2008), pp. 1-5.
Singh et al. ; "Future of Internet Security—IPSEC"; 2005; pp. 1-8.
Spring et al., "A protocol-independent technique for eliminating redundant network traffic", ACM SIGCOMM Computer Communication Review, vol. 30, Issue 4 (Oct. 2000) pp. 87-95, Year of Publication: 2000.
Supplemental Notice of Allowability, dated Oct. 9, 2014, U.S. Appl. No. 13/657,733, filed Oct. 22, 2012.

(56) References Cited

OTHER PUBLICATIONS

"Business Wire, ""'Silver Peak Systems Delivers Family of Appliances for Enterprise-Wide Centralization of Branch Office Infrastructure; Innovative Local Instance Networking Approach Overcomes Traditional Application Acceleration Pitfalls"" (available at http://www.businesswire.com/news/home/20050919005450/en/Silver-Peak-Syste-ms-Delivers-Family-Appliances-Enterprise-Wide#.UVzkPk7u-1 (last visited Aug. 8, 2014))."

"Decision Granting Motion to Terminate", Inter Partes Review Case No. IPR2014-00245, Feb. 7, 2018, 4 pages.

"Hong, B et al. ""Duplicate data elimination in a SAN file system""", In Proceedings of the 21st Symposium on Mass Storage Systems (MSS '04), Goddard, MD, Apr. 2004. IEEE, pp. 101-114."

"IPsec Anti-Replay Window: Expanding and Disabling," Cisco IOS Security Configuration Guide. 2005-2006 Cisco Systems, Inc. Last updated: Sep. 12, 2006, 14 pages.

"Notice of Entry of Judgement Accompanied by Opinion", United States Court of Appeals for the Federal Circuit, Case: 15-2072, Oct. 24, 2017, 6 pages.

"Shared LAN Cache Datasheet", 1996, <http://www.lancache.com/slcdata.htm>, 8 pages.

Advisory Action, dated Apr. 4, 2013, U.S. Appl. No. 13/517,575, filed Jun. 13, 2012.

Advisory Action, dated Aug. 20, 2012, U.S. Appl. No. 12/313,618, filed Nov. 20, 2008.

Advisory Action, dated Dec. 3, 2013, U.S. Appl. No. 13/288,691, filed Nov. 3, 2011.

Advisory Action, dated Jan. 24, 2013, U.S. Appl. No. 13/427,422, filed Mar. 22, 2012.

Advisory Action, dated Jan. 29, 2013, U.S. Appl. No. 12/217,440, filed Jul. 3, 2008.

Advisory Action, dated Jan. 9, 2017, U.S. Appl. No. 15/091,533, filed Apr. 5, 2016.

Advisory Action, dated Jul. 16, 2013, U.S. Appl. No. 11/498,491, filed Aug. 2, 2006.

Advisory Action, dated Jul. 2, 2012, U.S. Appl. No. 12/217,440, filed Jul. 3, 2008.

Advisory Action, dated Jun. 27, 2014, U.S. Appl. No. 13/274,162, filed Oct. 14, 2011.

Advisory Action, dated Mar. 21, 2016, U.S. Appl. No. 14/679,965, filed Apr. 6, 2015.

Advisory Action, dated Mar. 25, 2015, U.S. Appl. No. 13/274,162, filed Oct. 14, 2011.

Advisory Action, dated Mar. 5, 2015, U.S. Appl. No. 13/288,691, filed Nov. 3, 2011.

Advisory Action, dated May 23, 2011, U.S. Appl. No. 11/998,726, filed Nov. 30, 2007.

Advisory Action, dated Nov. 25, 2011, U.S. Appl. No. 11/498,491, filed Aug. 2, 2006.

Advisory Action, dated Nov. 25, 2015, U.S. Appl. No. 13/621,534, filed Sep. 17, 2012.

Advisory Action, dated Oct. 2, 2009, U.S. Appl. No. 11/498,473, filed Aug. 2, 2006.

Advisory Action, dated Sep. 27, 2013, U.S. Appl. No. 13/427,422, filed Mar. 22, 2012.

Corrected Notice of Allowability, dated Aug. 5, 2015, U.S. Appl. No. 14/248,188, filed Apr. 8, 2014.

Corrected Notice of Allowability, dated Mar. 14, 2016, U.S. Appl. No. 14/677,841, filed Apr. 2, 2015.

Corrected Notice of Allowability, dated Mar. 7, 2016, U.S. Appl. No. 14/543,781, filed Nov. 17, 2014.

Decision on Appeal, dated Jun. 28, 2012, U.S. Appl. No. 11/240,110, filed Sep. 29, 2005.

Decision on Appeal, dated Nov. 14, 2012, U.S. Appl. No. 11/497,026, filed Jul. 31, 2006.

Decision on Appeal, dated Sep. 17, 2012, U.S. Appl. No. 11/202,697, filed Aug. 12, 2005.

Definition memory (n), Webster's Third New International Dictionary, Unabridged (1993), available at <http://lionreference.chadwyck.com> (Dictionaries/Webster's Dictionary).

Douglis, F. et al., "Application specific Delta-encoding via Resemblance Detection", Published in the 2003 USENIX Annual Technical Conference, pp. 1-14.

Examiner's Answer to Appeal Brief, dated Oct. 14, 2009, U.S. Appl. No. 11/497,026, filed Jul. 31, 2006.

Examiner's Answer to Appeal Brief, dated Oct. 27, 2009, U.S. Appl. No. 11/202,697, filed Aug. 12, 2005.

Examiner's Answer to Appeal Brief, dated Oct. 27, 2009, U.S. Appl. No. 11/240,110, filed Sep. 29, 2005.

Final Office Action, dated Apr. 1, 2014, U.S. Appl. No. 13/274,162, filed Oct. 14, 2011.

Final Office Action, dated Apr. 15, 2013, U.S. Appl. No. 11/498,491, filed Aug. 2, 2006.

Final Office Action, dated Apr. 18, 2012, U.S. Appl. No. 12/217,440, filed Jul. 3, 2008.

Final Office Action, dated Apr. 23, 2012, U.S. Appl. No. 11/998,726, filed Nov. 30, 2007.

Final Office Action, dated Aug. 12, 2011, U.S. Appl. No. 11/498,473, filed Aug. 2, 2006.

Final Office Action, dated Aug. 17, 2011, U.S. Appl. No. 11/498,491, filed Aug. 2, 2006.

Final Office Action, dated Aug. 7, 2009, U.S. Appl. No. 11/498,473, filed Aug. 2, 2006.

Final Office Action, dated Dec. 18, 2014, U.S. Appl. No. 13/288,691, filed Nov. 3, 2011.

Final Office Action, dated Dec. 21, 2015, U.S. Appl. No. 14/679,965, filed Apr. 6, 2015.

Final Office Action, dated Dec. 31, 2008, U.S. Appl. No. 11/497,026, filed Jul. 31, 2006.

Final Office Action, dated Dec. 8, 2010, U.S. Appl. No. 12/070,796, filed Feb. 20, 2008.

Final Office Action, dated Feb. 1, 2013, U.S. Appl. No. 12/070,796, filed Feb. 20, 2008.

Final Office Action, dated Feb. 10, 2012, U.S. Appl. No. 12/070,796, filed Feb. 20, 2008.

Final Office Action, dated Feb. 17, 2017, U.S. Appl. No. 15/148,933, filed May 6, 2016.

Final Office Action, dated Feb. 22, 2008, U.S. Appl. No. 11/202,697, filed Aug. 12, 2005.

Final Office Action, dated Feb. 22, 2012, U.S. Appl. No. 13/112,936, filed May 20, 2011.

* cited by examiner

Source IP/destination IP "Application name" count

400

| | |
|---|---|
| 410 | a.b.c.d/e.f.g.h FTP +1 |
| 420 | a.b.c.d/i.j.k.l "Google" +25 |
| 430 | a.b.c.d/m.n.o.p "Amazon" +10 |

FIG. 4 destination IP/min(destination port, source port) "Application name" count

MULTI-LEVEL LEARNING FOR CLASSIFYING NETWORK TRAFFIC FLOWS FROM FIRST PACKET DATA

CROSS-REFERENCE TO RELATED APPLICATIONS

The present application is a continuation of, and claims the priority benefit of, U.S. patent application Ser. No. 15/632,008 filed on Jun. 23, 2017 and entitled "Multi-level Learning for Classifying Traffic Flows from First Packet Data", which in turn is a continuation-in-part of, and claims the priority benefit of, U.S. patent application Ser. No. 15/425,798 filed on Feb. 6, 2017 and entitled "Multi-level Learning for Classifying Traffic Flows". The disclosures of the above-reference applications are incorporated herein in their entirety for all purposes.

TECHNICAL FIELD

This disclosure relates generally to the classification of a network traffic flow and prediction of an associated application name and/or associated application characteristics based on the classification.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Typically, data is sent between computing devices across a communications network in packets. The packets may be generated according to a variety of protocols such as Transmission Control Protocol (TCP), User Datagram Protocol (UDP), or the like. A network appliance in a network can be connected to many other computing devices via many different network paths. Furthermore, the network paths may traverse multiple communication networks.

When selecting a network path for a particular data traffic flow, a network appliance may first need to classify the flow to determine which network path is appropriate or optimal for the flow. The network path selection needs to be made on a first packet for a flow. However, often a first packet for a flow is merely a packet for establishing a connection and may only have limited information, such as only header information. Thus, mechanisms are needed for classifying a traffic flow based on the limited information available in a first packet for a flow.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In various embodiments of the present disclosure, a method of selecting a network path for transmitting data across a network is disclosed. The method may comprise: receiving at a first network appliance, a first data packet of a first flow to be transmitted across a network; extracting information from a header of the first data packet; generating a key representing the extracted information from the header of the first data packet; verifying that the key is present in a data structure at the first network appliance; predicting an associated application name for the first flow based on the key; verifying that the application prediction in the data structure at the first network appliance meets a confidence threshold; selecting by the network appliance a network path based on the application prediction; and transmitting the first packet of the first flow by the first network appliance based on the selected network path.

In other embodiments, a method for inferring an application name from header information extracted from a first data packet of a first flow is disclosed. The method comprises: receiving at a first network appliance, a first data packet of a first flow to be transmitted across a network; extracting information from a header of the first data packet; building a key string from the extracted information; determining that the key is present in one or more data structures at the first network appliance, the one or more data structures comprising information regarding keys and associated application names; verifying that a prediction confidence level for an application name associated with the key that is present in the one or more data structures meets a confidence threshold; predicting an application name for the first data packet of the first flow; and determining a network path for transmission of the first flow based on the predicted application name.

Also described herein is a system for inferring an application name for a first packet of a flow at a network appliance, the system comprising: a feature extraction engine at the network appliance to extract information from the first packet of the flow received at the network appliance; an inspection engine at the network appliance to determine whether the extracted information is indicative of a known application name; and an inference engine at the network appliance to infer an application name for the first packet based on the extracted information, the inference engine further in communication with a plurality of data structures comprising key strings and associated predicted application names.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

FIG. 4 depicts an exemplary table for tracking an exemplary string of data.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to mechanisms for classifying flows via a first packet of the flow.

I. Steering Network Traffic

In some circumstances, the determination of which communication network to use to transfer packets of a particular flow must be made on the first packet of the flow. Because there can be multiple network paths (including different communication networks and layers of overlay tunnels) for transmitting data, traffic needs to be steered in a Wide Area Network (WAN). In many cases, once a flow transmission begins over a particular network path, all packets of the flow need to be transmitted over the same path. In addition, different types of data may be transmitted over differing network paths depending on whether the network is trusted or not.

Further, in many cases, internet traffic from a particular location is routed to one firewall that is located in a branch center or in a data center. However, in an environment where multiple firewalls are used for different kinds of traffic, routing data over some networks is more expensive than routing data over other types of networks. Additionally, better and more direct paths can be found from a source to a destination.

Figure 1A:
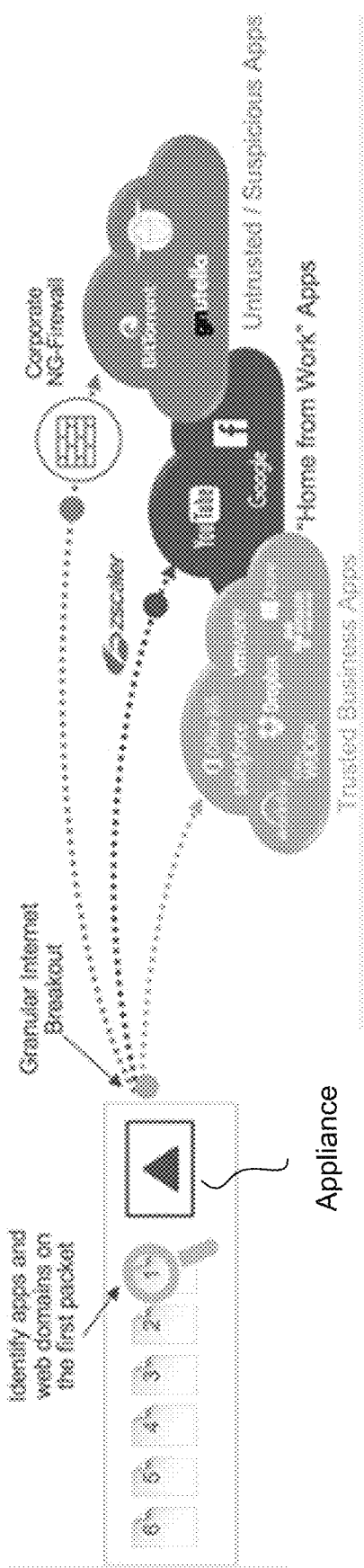
FIG. 1A depicts an exemplary environment within which the present disclosure may be implemented.

In an exemplary environment of FIG. 1A, an appliance in a network receives data packets for transmission. The appliance needs to determine in which direction to steer the data packets, depending on whether the data is associated with a trusted business application, a recreational application, or an untrusted/suspicious application. The determination of the application generating the data flow needs to be made on the first packet of the flow so that the appliance can send the data over the correct path. Further, while trusted business application data may be transmitted over the general Internet, recreational application may be sent to a cloud firewall. Untrusted or suspicious applications, such as traffic to prohibited or suspicious websites, may be sent to a data center. At the data center, this traffic may be logged, inspected for viruses/malware, or be treated more carefully by the appliance. Thus, it is important to know which application the data packets are associated with before transmission can begin by the appliance.

Figure 2:
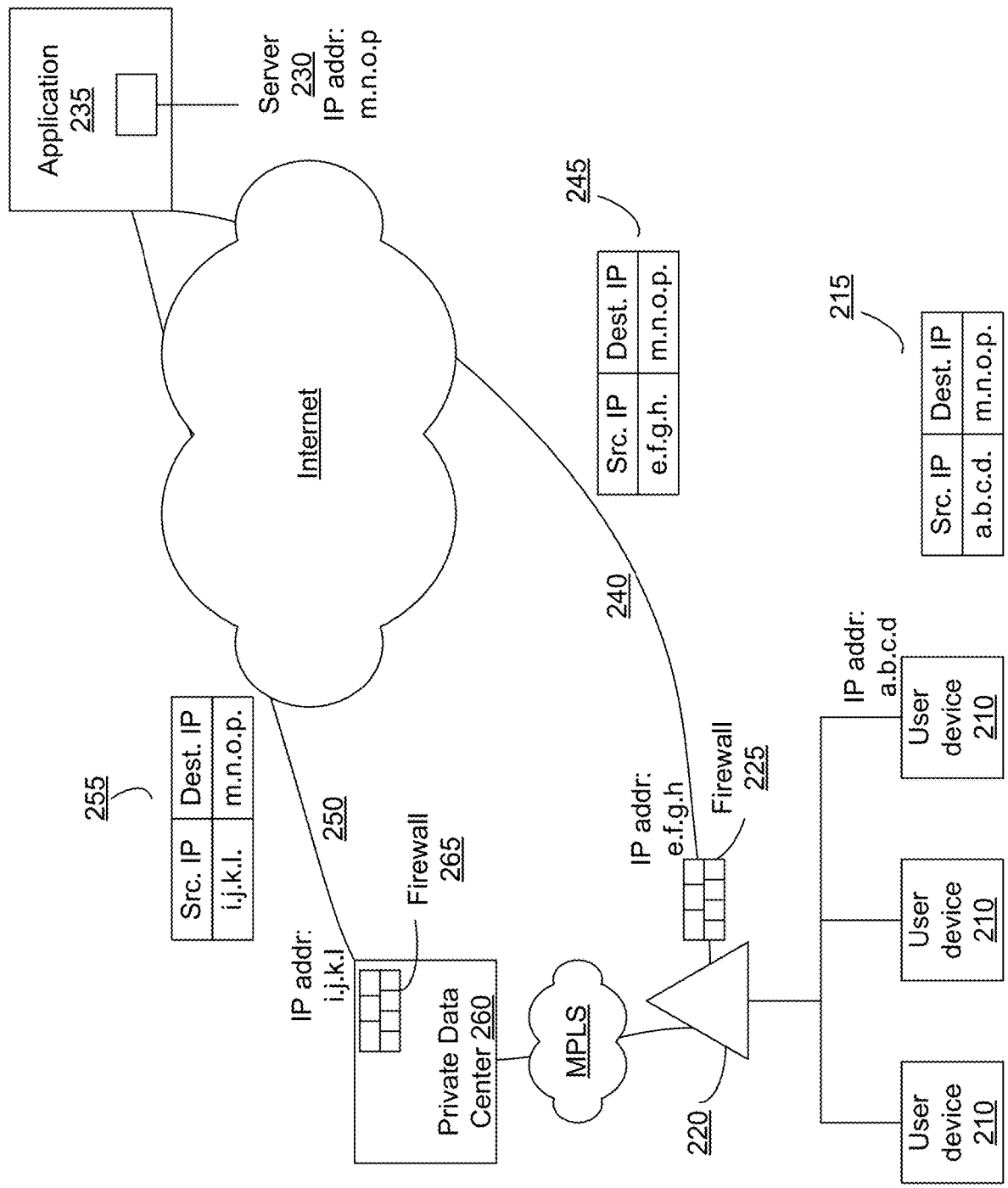
FIG. 2 depicts another exemplary environment within which the present disclosure may be implemented.

In an exemplary environment of FIG. 2, one or more user computing devices are connected to a network appliance 220, also sometimes referred to herein as appliance 220. In the exemplary environment, the appliance 220 is connected to an MPLS network and an Internet network. A user computing device 210 may initiate a connection to an application 235 that is hosted by server 230. Server 230 is also sometimes referred to herein as application server 230. Typically, the application 235 can be any application that is accessible from the public Internet, such as any website, but the present disclosure is not limited to that embodiment. Application 235 can comprise an entire application, or simply a part of an application. That is, application 235 can be hosted by a single server, or by a combination of servers. Each server may be physical or virtual, and each server may be in different geographic locations. For example, in one embodiment, application 235 may provide a web-based email service hosted by a single server. In another embodiment, application 235 may provide a news aggregation service, with news articles provided by multiple servers located in different geographic locations.

Based on the IP address of server 230 that is hosting application 235, and/or the location of server 230, embodiments of the present disclosure provide for an inference to be made as to the name of the application 235 hosted by server 230. For example, by learning which destination server IP addresses are associated with which application names, the name of application 235 can be inferred in the future from the destination server IP address in a data packet transmitted by user computing device 210 to initiate a connection with application 235.

While the exemplary environment of FIG. 2 depicts just one server 230 for the application 235, there can actually be many physical or virtual servers at a geographic location hosting the application 235. Furthermore, while not depicted here, there can be any number of additional network components present, such as load balancers, routers, switches, firewall, etc. There may also be layers of address translation inside a data center hosting application 235, such that the apparent server IP address for server 230 appears different publicly than internally inside the data center. For simplicity, a single server 230 is described here with a single public IP address. However, a person of ordinary skill in the art will understand that the single server scenario depicted herein can be generalized to more complicated scenarios involving multiple servers.

The user request to access the application 235 hosted at the location may be routed by appliance 220 directly through the Internet, or through an MPLS network to private data center 260 first, and then over the Internet. There may additionally be one or more firewalls along either or both paths.

The traffic originating from user computing device 210 may have a private source IP address such as a.b.c.d, and a destination IP address for server 230 of m.n.o.p., as shown in table 215 of FIG. 2. However, the appliance 220 and/or the firewall 225 may perform network address translation to alter the source IP to a different address such as e.f.g.h. While firewall 225 is depicted as being external to appliance 220, it may actually be internal to appliance 220 in some embodiments. If the data traffic is routed over path 240 to application server 230, then the flow between user computing device 210 and application server 230 will appear to the application server 230 as having an apparent source IP address of e.f.g.h and a destination IP address of m.n.o.p., as depicted in table 245 of FIG. 2.

In another embodiment, the data traffic from user computing device 210 to application server 230 is routed through the MPLS network first to a private data center 260. A firewall 265 in the private data center 260 may perform network address translation to a different source IP address, such as i.j.k.l. This network address translation could be performed by a firewall appliance, a server, a router, or other device. Thus, the data traffic routed over path 250 to application server 230 will have an apparent source IP address of i.j.k.l at the application server 230 and a destination IP address of m.n.o.p., as shown in table 255 of FIG. 2. In this way, even though the user computing device 210 originating the flow is the same, the application server 230 views incoming traffic from path 240 as being different from incoming traffic from path 250 since the source IP address for traffic arriving on path 240 is different from the source IP address for traffic arriving on path 250.

Because of the network address translation, if a first packet of a flow is transmitted by appliance 220 to application server 230 over path 240, but a second packet of the same flow is transmitted by appliance 220 to application server 230 over path 250, the server will not recognize the two packets as belonging to the same flow. This can become problematic if, for example, a TCP handshake is conducted over path 240 and data traffic is transmitted over path 250. Thus, appliance 220 needs to select an appropriate network path for transmitting data from user computing device 210 to application server 230, such that the same network path is used for all packets of a given flow.

Figure 1B:
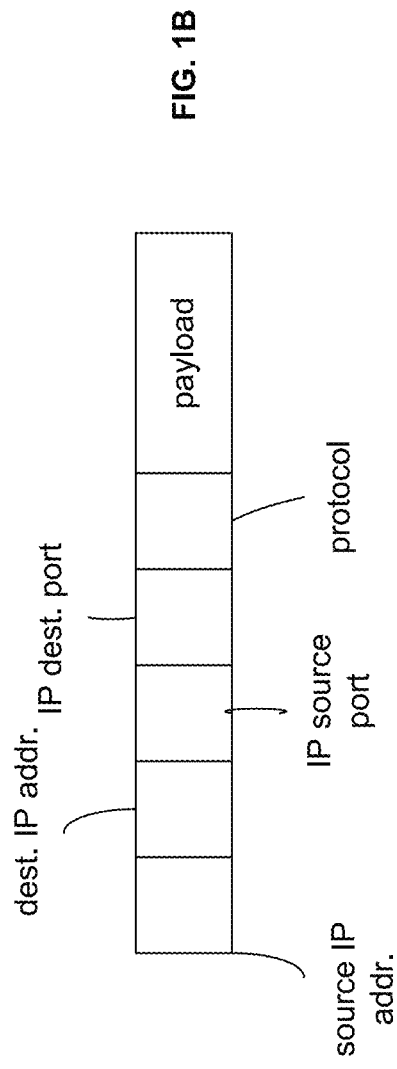
FIG. 1B depicts an exemplary data packet.

When steering traffic by appliance 220, a determination of which network path to take needs to be made on the first packet for each flow, as once traffic has started in one direction, the appliance 220 generally cannot change directions for the traffic flow. The selection of network path can be based on traffic type, name of application 235, destination IP address of the server 230, or any other such criteria. However, often a first packet is used to establish a connection between the two devices (such as a TCP SYN packet), and does not have much (if any) other information besides simply header information, as depicted in FIG. 1B. There may be no explicit information about traffic type or application name in the information in a first packet. As a result, these characteristics need to be inferred from the limited information that is available in the information in the first packet for the flow. While embodiments of the present disclosure refer to information in a TCP packet, a person of ordinary skill in the art would understand that this is equally applicable to packets of other types of protocols.

In exemplary embodiments of the present disclosure, a neural network or other such learning algorithm may be used by an appliance 220 to infer an application name and/or one or more application characteristics or "tags" from the limited information in a first packet of a flow. As used herein, an application characteristic may be any characteristic or property related to an application or traffic type. The characteristic may have multiple possible values of the key. For example, an application characteristic can be "safety" which represents the safety of the network traffic. This can have multiple key values, such as "very safe", "safe", "unsafe", "dangerous", etc. Furthermore, a "tag" as used herein may comprise a specific string, such as "safe", or "unsafe". In this way, a "tag" may represent a value of a "characteristic", or be independent from a characteristic.

While the application name is discussed herein as the tracked parameter that is inferred, there can actually be an inference made for any other parameter. For example, the inference made by the appliance may be regarding a tag (safe/unsafe), or any other parameter.

II. Key Strings

Once an inference is made by the appliance, the appliance begins steering a particular data flow over a particular network path. In a later packet of the flow, the name of the application that the flow is associated with may be apparent from payload information in the data packet. In exemplary embodiments of the present disclosure, the appliance can track information regarding the application and corresponding key value and build/update one or more data structures to influence the learning algorithm for future inferences.

Figure 3A:
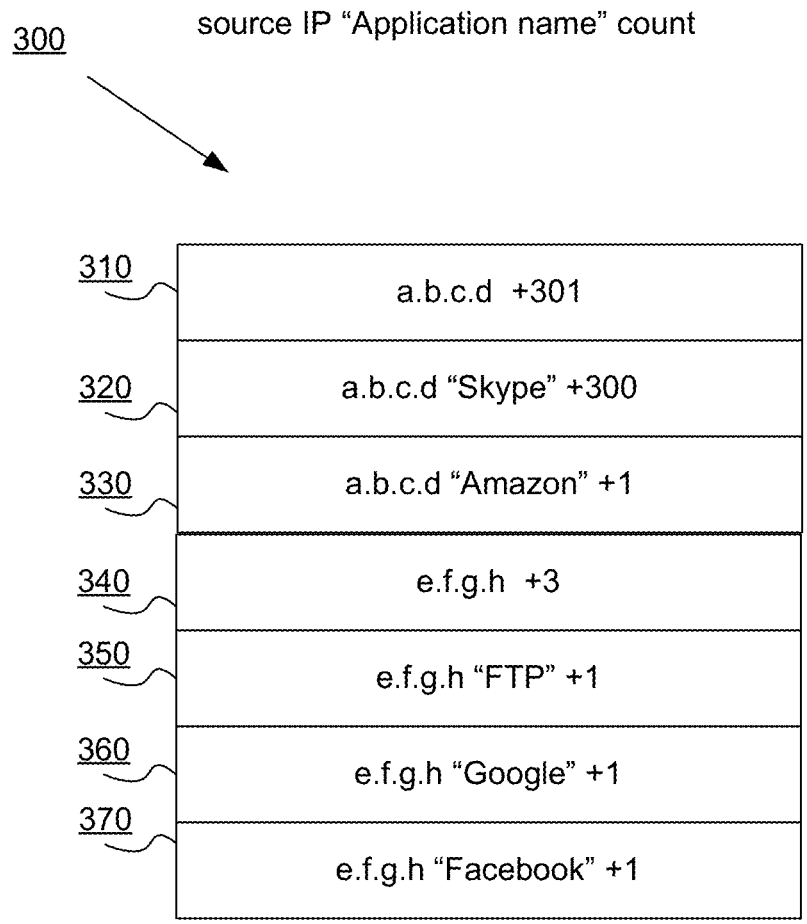
FIG. 3A depicts an exemplary data structure that is constructed by an appliance.

FIG. 3A depicts an exemplary table 300 that is constructed from selected information in a first packet of a flow. A string of information is built in a hierarchical manner in the depicted table. While the general term table is used here, a person of ordinary skill in the art would understand that the data can actually be stored in any type of data structure, including table(s), database(s), nodes, etc.

A network administrator can determine one or more strings of information to track. For example, a network administrator may determine a source IP address should be collected, along with the name of the corresponding application that the flow is associated with. In the exemplary table 300, a network appliance collects information regarding a source IP address, the name of the associated application (regardless of inference), and a counter for how many times that combination has been viewed. The counter indicates a confidence level of the inference. In exemplary table 300, the tracked string of information is shown on a row in a concatenated manner. However, as would be understood by persons of ordinary skill in the art, the information can be collected and stored in any manner.

Rows 320 and 330 of table 300 depicts that data traffic from source IP address a.b.c.d was associated with the application "Skype" three hundred times and data traffic from source IP address a.b.c.d was associated with the application "Amazon" one time. Row 310 shows the global counter for source IP address a.b.c.d, which is that the particular source IP address was encountered by the appliance three hundred one times. From the counter, confidence information can be gleaned as to how the accuracy of the predicted application name, as discussed herein.

Row 340 of exemplary table 300 shows that network appliance also steered traffic from a source IP address of e.f.g.h for a total of three times. Rows 350-370 show that one time data traffic from source IP address e.f.g.h was associated with an FTP (file transfer protocol) server, one time it was associated with the Google application, and one time it was associated with the Facebook application.

From table 300, a determination can be made as to how well a source IP address can predict the associated application. For example, with source IP address a.b.c.d, predicting that the data traffic is associated with the "Skype" application is overwhelmingly accurate (>99%), and thus using this source IP address to infer an application name is likely to yield a good inference. However, source IP address e.f.g.h is associated with FTP 33% of the times, Google 33% of the time, and to Facebook 33% of the time. Thus, simply knowing that a source IP address is e.f.g.h does not allow the appliance to make a good prediction as to which application the data traffic is associated with.

While table 300 tracks a source IP address, a person of ordinary skill in the art would understand that table 300 can actually track any singular field, such as destination IP address, IP source port, IP destination port, etc.

Figure 3B:
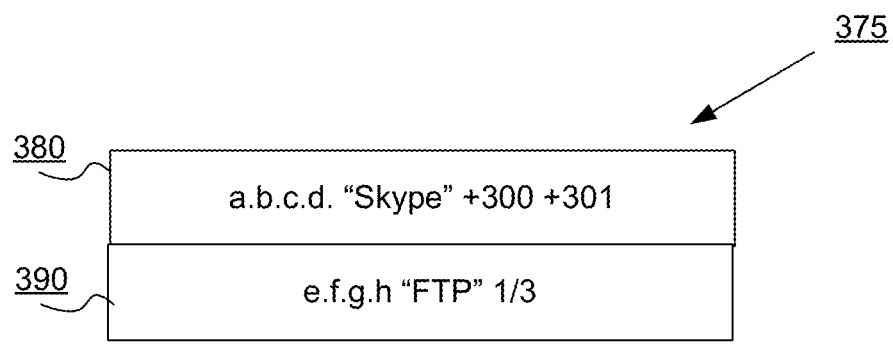
FIG. 3B depicts another exemplary data structure that is constructed by an appliance.

FIG. 3B depicts another exemplary table 375 that can be constructed from information regarding a source IP address, along with the name of the associated application for the flow. In the exemplary table, a network appliance collects information regarding a source IP address, the name of the application that the traffic from that source IP address is associated with (regardless of inference), a counter for how many times that combination has been viewed, and a counter for how many flows have represented that combination, to yield confidence information regarding the prediction. In the exemplary table 375, this information is shown on a row in a concatenated manner. However, as would be understood by persons of ordinary skill in the art, the information can be collected and stored in any manner. Table 375 of FIG. 3B encompasses similar information as table 300 of FIG. 3A, but requires less storage space at the appliance while still providing relevant information needed by the appliance to make an inference regarding application name.

Row 380 depicts that data traffic from source IP address a.b.c.d was associated with the application "Skype" three hundred times out of a total of three hundred one flows processed by the appliance within the tracked time period. Row 390 shows that network appliance also steered traffic from a source IP address of e.f.g.h for a total of three times. One time data traffic from source IP address e.f.g.h was associated with an FTP (file transfer protocol) server. While row 390 depicts this information with the exemplary notation "⅓", a person of ordinary skill in the art would understand that any notation can be used to depict one out of three flows, including punctuation, spacing, etc.

From a table such as table 375, a determination can be made as to how well a source IP address can predict the application that data traffic is associated with. For example, with source IP address a.b.c.d, predicting that the data traffic is associated with the "Skype" application is overwhelmingly accurate (>99%), and thus using this source IP address to infer an application name is likely to yield a good inference. However, source IP address e.f.g.h is associated with FTP 33% of the times. Thus, simply knowing that a source IP address is e.f.g.h does not allow the appliance to make a good prediction as to which application the data traffic is associated with.

Again, while the table 375 of FIG. 3B tracks an source IP address, a person of ordinary skill in the art would understand that the table can actually track any singular field, such as destination IP address, IP source port, IP destination port, etc. Further, any combination of fields can be tracked in a manner similar to table 375.

In various embodiments, the exemplary tables 300 and 375 may store information regarding all flows observed by the network appliance within a particular time period, or any other limited window. After the expiration of the time period, the table(s) can be purged as discussed herein to accommodate for gathering of information of future flows. In other embodiments, the exemplary tables 300 and 375 may be dynamic. In some embodiments, such that the appliance may only track one possibility for each key, for instance the application from the most recent flow observed (for example, only the information in row 390 rather than the three rows 350, 360 and 370). In this way, the table does not have to store information about every flow observed by the appliance and the appliance can still infer application names without storing ever increasing amounts of data. More information regarding how data is accumulated in these data structures of the appliance is discussed below with respect to the pseudocode.

FIG. 4 depicts an exemplary table 400 for tracking another exemplary string, that of the combination of source IP address and destination IP address. Row 410 shows that data traffic from source IP address of a.b.c.d was destined for a destination IP address of e.f.g.h one time, and that traffic was for an FTP application. Row 420 shows that data traffic from source IP address of a.b.c.d was destined for a destination IP address of i.j.k.l a total of 25 times, and that traffic was associated with the Google application. Row 430 shows that data traffic from source IP address of a.b.c.d was destined for a destination IP address of m.n.o.p a total of 10 times, and that traffic was associated with the Amazon application.

By collecting this information, an appliance can infer how well a particular source IP address and destination IP address combination can predict the application name associated with the flow. If the combination is a good predictor, then that information can be used by the learning algorithm of the appliance to infer a classification of future data flows from the particular IP address combination.

Figure 5:
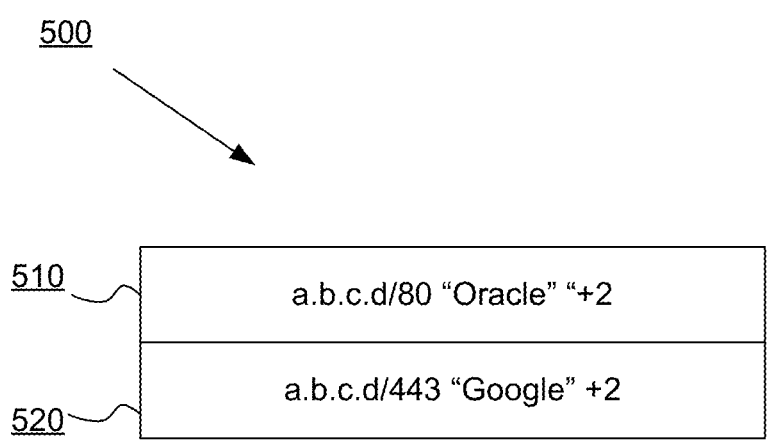
FIG. 5 depicts another exemplary table for tracking an exemplary string of data.

FIG. 5 depicts an exemplary table 500 that is constructed from a destination IP address and a minimum of a source port and destination port. Typically, when a person visits a website, the destination port is commonly port number 80 for http protocol and port number 443 for https protocol. However, the source port can be a random value. Also, the destination port is typically the smaller port number. By storing the minimum of the two ports, an inference can be made on the type of traffic based on the common port numbers.

In an exemplary embodiment, an appliance may have processed four different data flows: (1) a data flow processed one time for a destination IP address of a.b.c.d, destination port number 80, and source port number 30002, for an Oracle application; (2) a data flow processed one time for the same IP address, destination port number 80, and source port number 38955 for an Oracle application. This information can be combined and stored as row 510 in exemplary table 500 of FIG. 5. Only the minimum port number, 80, is stored in the table and the counter reflects that this information was processed two times by the appliance, within the tracked time period.

The appliance may further have processed data flow (3) for a destination IP address of e.f.g.h., destination port number 443, source port number 40172 for application name "Google", and (4) one data flow for the same destination IP address, destination port number 443, source port number 39255, for the application name "Google". This information can be combined and stored as row 520 in exemplary table 500. Only the minimum port number, 443, is stored in the table and the counter reflects that this information was processed two times by the appliance, within the tracked time period.

Since the source port will typically be a random number, tracking each port number combination would generate many rows, a significant portion of which will be unlikely to be good predictors of future flows due to the randomness of the port assignment. However, by storing only the minimum port number in the table, information regarding multiple data flows can be combined in each row (such as row 510) to show that data traffic for destination IP address of a.b.c.d and a minimum port number of 80 is associated with Oracle traffic. In this way, only information that is likely to be useful in a future prediction with a high level of confidence is tracked by the appliance.

Further, as discussed herein, table 500 may actually store only one row for each key (e.g. IP address, or IP address and port combination) and the most likely application associated with the key, rather than multiple rows for every application associated with the key. In addition, while not depicted in FIG. 5, table 500 may store a counter for how many times the particular application association was processed out of the total number of flows with the same key, to track the accuracy and/or confidence level of the prediction.

In this way, similar tables can be constructed for any field or combination of fields—not only the IP address and port combinations discussed herein. Similarly, tables can be constructed for various packet properties, such as packet length, optimization system, encryption status, etc. Similar tables can also be constructed for application characteristics and/or application tags. Further, while tables are discussed herein, a person of ordinary skill in the art would understand that any type of data structure can be utilized.

III. Building Key Strings

Figure 11:
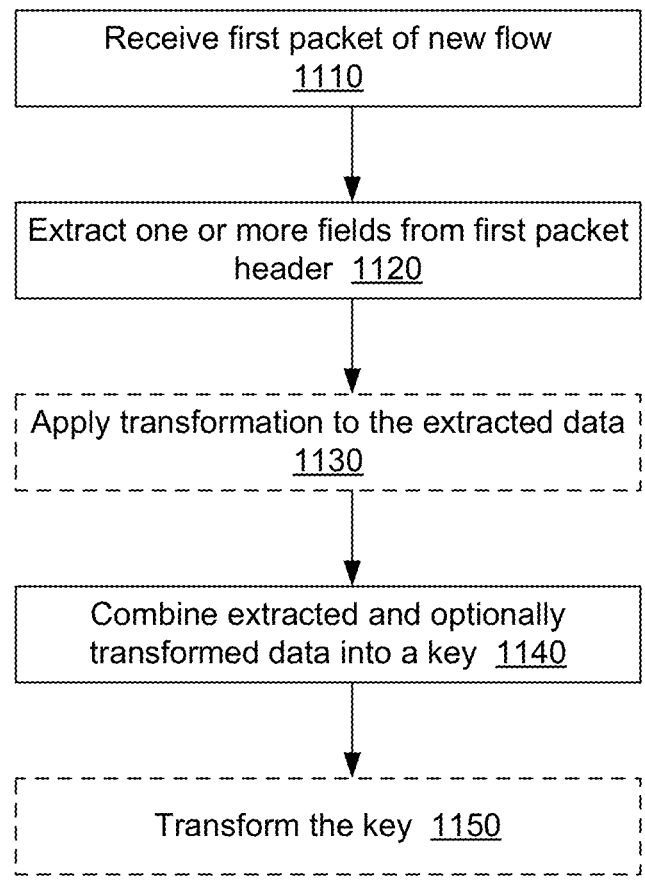
FIG. 11 depicts an exemplary method undertaken by a network appliance in computing a key from packet (header) data.

FIG. 11 depicts an exemplary method undertaken by a network appliance (such as appliance 220 of FIG. 2) in computing a key from packet data. In step 1110, appliance 220 receives a first packet of a new flow. The appliance 220 then extracts information from the first packet in step 1120 (using a feature extraction engine). As discussed herein, the first packet may contain only header information if it is, for example, a TCP SYN packet. In other embodiments, the first packet may have more than just header information. In any case, the extraction engine of appliance 220 extracts the information available from the first packet for the flow. In step 1130, any transformation may optionally be applied to the extracted data. The transformation may include determining the minimum port number, as discussed above with reference to FIG. 5, or any other transformation. In step 1140, the extracted and optionally transformed data are combined into a key. The key value is optionally transformed in step 1150, such as hashed.

Exemplary pseudocode that may be utilized to accomplish this method is shown below.

How to compute a key from packet [header] data:
1. Receive [first] packet of a flow
2. Extract one or more fields from packet [header], e.g. a combination of source/destination IP address, source/destination port, protocol
3. Optionally apply a transformation to the extracted data e.g. minport=min(destination port, source port)
4. Combine the extracted and optionally transformed data into a key e.g. 8 bytes of source IP+destination IP
5. Optionally transform the key (e.g. compute key=hash (key))

Figure 12:
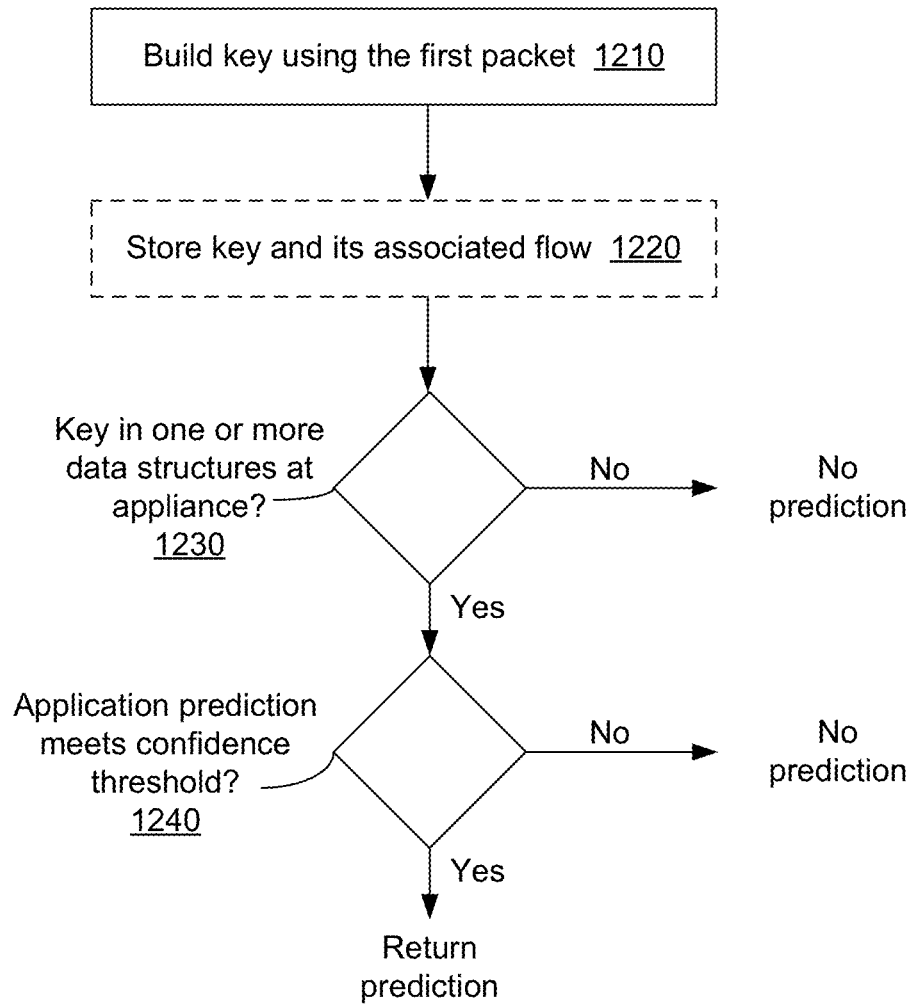
FIG. 12 depicts an exemplary method undertaken by a network appliance when a first packet of a flow arrives.

FIG. 12 depicts an exemplary method undertaken by a network appliance such as appliance 220 of FIG. 2, when a first packet of a flow arrives. In step 1210, the appliance builds a key using the first packet information. The key and its associated flow information can optionally be stored at the appliance in step 1220. Information regarding when new information is stored in a table and when it is not stored is discussed herein.

In step 1230, a determination is made as to whether the key is present in one or more data structures at the appliance. If not, then no prediction or inference is made by the appliance. If yes, then a determination is made in step 1240 if the application prediction meets a confidence level threshold. If the prediction does meet a predetermined confidence level threshold, then a prediction is returned. If not, then no prediction is returned. If a prediction is returned, then the appliance may determine a next hop along a network path, for transmission of the data flow. If no prediction is returned, then the data flow may be dropped by the appliance, or a next hop along a default network path is chosen by the appliance for transmission of the data flow.

In various embodiments, the requisite confidence threshold for returning a prediction can be any value determined by a network administrator, and can be adjusted as needed. Further, the confidence threshold can be variable depending on any parameter, such as source IP address, destination IP address, source port, destination port, protocol, application name, etc. That is, different parameters may have different confidence thresholds for returning a prediction and utilizing the prediction by the appliance in determine how to process a data packet.

Furthermore, the confidence level for a particular prediction may be gleaned from one table (such as exemplary tables 300, 375, 400, and 500), or from a combination of different tables. That is, a key may be present in multiple data structures at the appliance. Each data structure may have the same confidence level for the key, or different confidence levels for the key. A mathematical operation may be used to combine the information in multiple tables and determine an aggregate confidence level for the key. The aggregate confidence level may be determined using any mathematical operation, neural network, or through any other mechanism. Furthermore, each data structure may have its own confidence level, separate and apart from a confidence level for a particular key in the data structure. In various embodiments, a confidence level for a particular key may be combined with a confidence level for the data structure it appears in, to determine an aggregate confidence level. This aggregate confidence level may be compared to the confidence threshold to determine whether the appliance should rely on the prediction or not.

For example, if a particular source IP address is present in a source IP address table such as table 375, and also present in a table such as table 400 that tracks source IP address/destination IP address combinations, then the confidence level of the source IP address from each table may be combined to yield an aggregated confidence level for the source IP address.

Exemplary pseudocode that may be utilized to accomplish this method is shown below.

In an example implementation, each node of a data structure may have at least three pieces of information: total count, success count, and name (a string name of the predicted application). A confidence level is computed as Success Count/Total Count. If the confidence level is >99%, return name. Otherwise, no prediction is returned. As discussed above, the confidence level required to return an application name prediction can be variable. Further, the confidence level threshold required to return an application name prediction can be either the confidence level associated with a particular key in one data structure, a confidence level associated with a key in multiple data structures, a confidence level associated with a key and a data structure, or any combination of the above.

Figure 13:
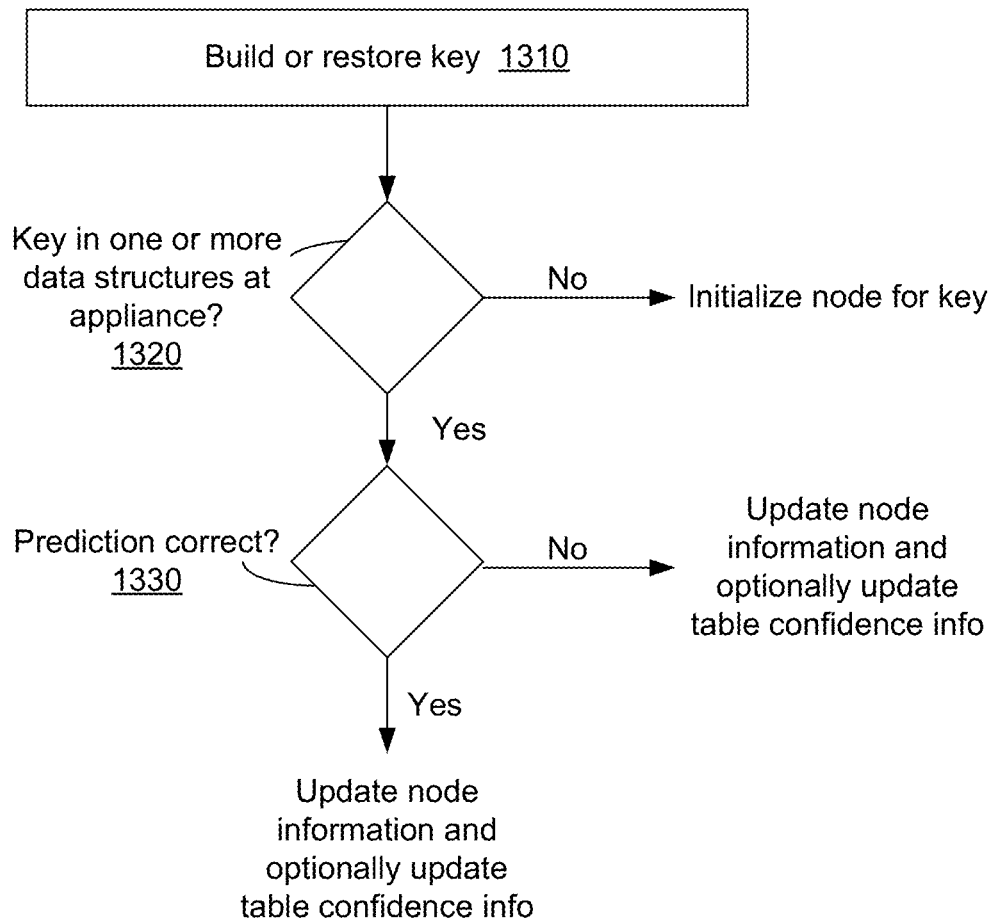
FIG. 13 depicts an exemplary method undertaken by a network appliance when the final application name of a flow is determined.

FIG. 13 depicts an exemplary method undertaken by a network appliance when the final application name of a flow is determined. In step 1310, the appliance builds or restores a key using the first packet information. The restoring if the key was optionally saved in a prior step. In step 1320, a determination is made as to whether the key is present in one or more data structures at the appliance. If not, then a node is initialized in the data structure for the key. If yes, then a determination is made in step 1330 as to whether the application prediction was correct. The node information and optionally the table confidence information is updated accordingly.

Exemplary pseudocode that may be utilized to accomplish this method is shown below.

In an example implementation for immediate replacement of a key string in a data structure, Total Count=1, Success Count=1, Name=final application name. While the application name did have 100% accuracy, there was only one instance of it. Thus, this is determined to not be a good predictor of application name due to the low sample size, and the field can be replaced with updated information when a new data flow is processed by the appliance.

In an example implementation for conditional replacement of a key string in a data structure, exemplary pseudocode that may be utilized to accomplish this is presented below:

```
If (Total_Count>5 && Success Count/Total Count>80%)
    // don't replace just yet
    Total Count+=1
    // optionally penalize further
    Success Count = Success Count * 0.9
Else
    // restart prediction with new name as hypothesis
    Total Count = 1
    Success Count = 1
    Name = final application name
```

Furthermore, as discussed above, the information that is tracked such as in exemplary tables 300, 375, 400 and 500 can be periodically purged to remove the items that are outdated, not good predictors, and/or to save storage space in the memory of an appliance. In some embodiments items that are not useful predictors might also be purged. For instance, if the prediction application association is already definitely known from data in the first packet. Exemplary pseudocode that may be utilized for background maintenance on the tables in the appliance is shown below. Background maintenance (periodic or triggered when data structure is nearly full):

1. Delete all nodes that have a total count<X
2. Delete all nodes that have not been accessed since time X (need to have an access time stored in each node)

A data structure may be considered to be nearly full or heavily utilized when a predetermined percentage of the available space has been utilized. Furthermore, either one or both of the criteria from the pseudocode may be satisfied before nodes are deleted. Other more complicated deletion criteria could be used. In other embodiments, the data structure can be purged periodically, based on elapse time, even when it is not full.

While the above embodiments are discussed in terms of predicted application names, the present disclosure can also be used to predict one or more application tags instead of, or in addition to, application names. Data structures such as those described in reference to FIGS. 3-5 can be used to track application tags instead of, or in addition to application names. Thus, a network appliance may be able to predict one or more tags to classify a flow and aid in steering the flow over the proper network path.

In one example, an appliance may have a table with a particular source IP address and destination IP address combination. The application name associated with that IP address combination may not meet a predetermined confidence level threshold, however a particular application tag may meet a predetermined confidence level threshold and thus used in the prediction. For example, the tag may denote that the data is likely "safe" or "unsafe", which can determine whether the flow is processed as a trusted business application or potentially malware for which further inspection is prudent. Further, the tag may denote a type of traffic, such as data, video, voice, etc., enabling the network appliance to implement a particular policy for handling the traffic types, despite not knowing the name of the specific application with a high level of confidence.

IV. Predicting Classification of Data Flows

As discussed above, the tables stored in the appliance may be periodically culled to only keep the data that is a good predictor, and discard data that does not yield a good prediction. "Good" prediction may be determined by evaluating subsequent packet data, as discussed above.

Furthermore, a network administrator may determine a threshold for a success count necessary before a prediction can be made, a threshold for a success count for keeping information in the tables, and/or a threshold for when rows are culled from a table, such as tables 300, 375, 400, and 500. In addition, to prevent the tables from continuously becoming larger, the tables may be stored as a hash, instead of as direct data.

Figure 8:
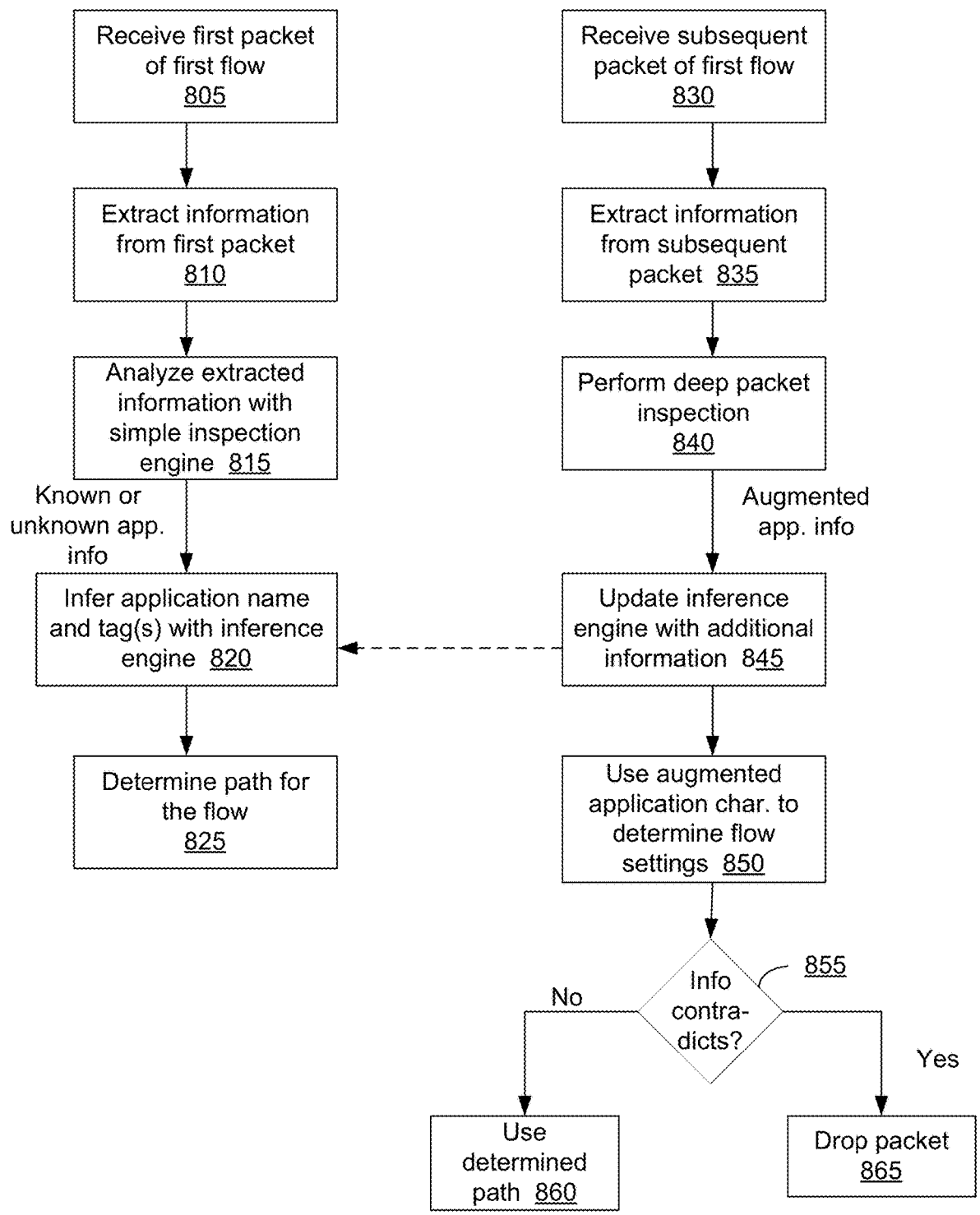
FIG. 8 depicts an exemplary method undertaken by the network appliance in steering traffic.

FIG. 8 depicts an exemplary method undertaken by a network appliance such as appliance 220 of FIG. 2, when steering traffic. In step 805, appliance 220 receives a first packet of a new flow. The appliance 220 then extracts information from the first packet in step 810 using a feature extraction engine. As discussed herein, the first packet may contain only header information if it is, for example, a TCP SYN packet. In other embodiments, the first packet may have more than just header information. In any case, the extraction engine of appliance 220 extracts the information available from the first packet for the flow. A simple inspection engine (such as inspection engine 910 of FIG. 9) is used to analyze the extracted information in step 815. A determination is made whether this information is indicative of known application names and/or one or more tags. An inference engine (such as inference engine 920 of FIG. 9) is then used to infer an application name and one or more application tags in step 820.

If the extracted information is indicative of known application names and/or tags, then the inference engine 920 uses the known mapping to classify the flow as belonging to the known application name and/or application tags or characteristics. If the extracted information is partially indicative of known application names and/or tags, or is not indicative of any known application names and/or tags at all, then an inference is made as to the application name associated with the flow and/or one or more application tags or characteristics. In some embodiments, the inference engine 920 is unable to make any inference as to application name and/or tag(s) and returns a value of "unknown". In various embodiments, a confidence percentage can be used by appliance 220 for the inspection engine 910 and/or the inference engine 920. For example, the engines may need to determine an application name and/or tag with a predetermined level of confidence before selecting that application name and/or tag as corresponding to the data in the packet being analyzed. The predetermined confidence level can be preset or be variable for different appliances, application names, tags/characteristics, enterprises, or based on time.

Once the appliance determines the application name and/or tag(s) via inference engine 920, the appliance determines a network path over which to transmit the flow in step 825. The selection of a path can be based on any number of factors. For example, the appliance may have a policy that all voice over IP traffic should be routed over an MPLS network while data traffic is routed over the public Internet. A determination from the inference engine 920 aids the appliance in determining which path to use for the flow. In some embodiments, if the inference engine 920 is unable to make an inference, then a default path may be selected.

When the appliance receives a second packet of the same flow in step 830, the second packet may continue to be routed over the chosen path for the first packet. However, the appliance may still analyze and extract information from the second packet to improve the learning and inference of the inference engine 920. Thus, information can be extracted from the subsequent packet in step 835. Typically, the subsequent packet may contain more information than was present in the first packet of the flow, and thus more information can be gleaned from this packet. Furthermore, information can be gleaned from a combination of data packets, and not simply a singular packet. That is, there may be data, such as an embedded domain name, that spans across multiple packet boundaries. For example, one packet may have "www.go" embedded within it, while a subsequent packet has "ogle.com" embedded within it. The domain name can be gleaned from a combination of the information in the two packets. While only two packets are discussed here, information can be gleaned from a combination of any number of packets.

Deep packet inspection, using any of the known methods, can be performed on the extracted information from the subsequent packet in step 840. The deep packet inspection will typically yield additional information about the associated application. This additional information can be useful for other future flows, such as FTP (File Transfer Protocol) control channel or DNS (Domain Name Server) queries. This additional information might not change the direction of routing for the current flow, but rather inform how future flows are handled by the appliance. In some embodiments, the deep packet inspection may find that the inferred application name and/or one or more inferred application tags or characteristics originally determined by the inference engine 920 for the first packet in step 820 was incorrect. The information is passed on to the inference engine 920 in step 845.

In other embodiments, the deep packet inspection may find that the inferred application and/or inferred tags originally determined for the first packet in step 820 was correct, but additional application characteristics or tags are gleaned from the deep packet inspection. This augmented information is passed on to the inference engine 920 in step 845 while traffic continues to be routed over the selected path for the flow. In step 850, the augmented application characteristics can be used to determine flow settings, such as quality of service or flow prioritization.

In step 855, a determination is made by the appliance whether the augmented information gleaned from a subsequent packet contradicts the original inference. Additionally, a confidence level for the contradiction may be determined, such that the augmented information can contradict the original inference on a sliding scale from strong to weak. If there is no contradiction, then the subsequent packet continues to be routed 860 over the path determined in step 825. If there is a contradiction with a low level of confidence, then the subsequent packet continues to be routed over the path determined in step 825. If there is a contradiction with a high level of confidence, then the appliance 650 may drop the packet in step 865 and optionally reset the connection (e.g., with an RST packet). In alternate embodiments, if there is a contradiction with a high level of confidence in step 865, the appliance may decide to route further packets on a new path associated with the augmented information, thus changing direction mid-flow. The destination server may not recognize the packets from the different path and reset the connection automatically.

It will be understood that where the term second packet is used herein, the process applies to any subsequent packet in the flow, regardless of whether it is actually chronologically the second, third, tenth, or any later packet. Further, the deep packet inspection may be performed for only one subsequent packet of a flow, or for multiple subsequent packets of a flow. In this way, a learning algorithm at the inference engine 920 is continually updated such that the inference made on the first packet can continue to be refined and the optimal path can be chosen for a given flow based only on limited information in the first packet of the flow.

In the exemplary environment of FIG. 2, appliance 220 receives traffic destined for application server 230. Based on information in the first packet (source IP a.b.c.d, destination IP m.n.o.p and TCP protocol), and observations of past history of flows with similar information, the appliance 220 may infer that this flow is for a particular application 235 hosted at server 230 and has a tag of "data" for file transfer traffic. Consequently, the appliance 220 may choose to transmit data through the Internet via path 240.

A subsequent packet of the same flow may contain information to determine that the flow is actually streaming video and thus the tag should have been "video" and not "data". Thus, the traffic type classification inferred by appliance 220 from the first packet was incorrect, and updates are made by the learning algorithm such that a subsequent flow with similar extracted information from the packet is classified as being streaming video traffic and not data traffic. In some embodiments, an incorrect classification may be detected a certain number of times before the learning algorithm alters the inferred application name, application characteristic(s), and/or one or more inferred application tags based on information in the first packet.

In other embodiments, information such as a timestamp may be used in conjunction with extracted information to infer an application name, application characteristic(s) and/or tags. For example, appliance 220 may determine that every Tuesday at 10 am, user computing device 210 initiates a Voice over IP (VoIP) call. Thus, traffic from a.b.c.d at that time is for VoIP, whereas at other times it is data. Upon observing traffic flows in this way, a distributed deep learning algorithm can determine patterns for traffic flowing through appliance 220 and use these patterns to better classify and infer data traffic flows from only information present in a first packet for each flow.

Figure 9:
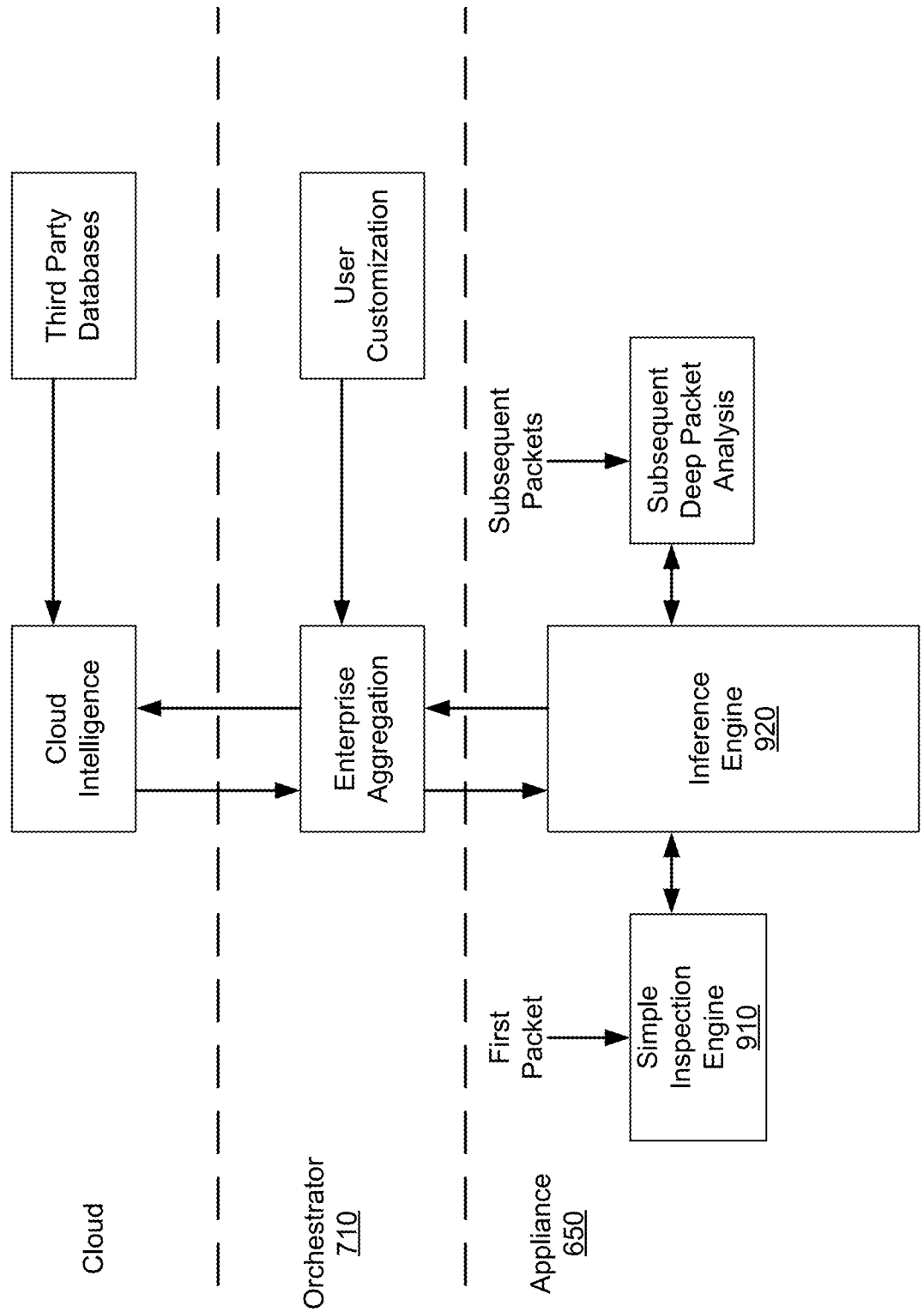
FIG. 9 depicts an exemplary system for aggregating information across multiple appliances.

In various embodiments, the inference engine at an appliance can be in communication with other databases to help refine the inference made on the first packet. As depicted in FIG. 9, the inference engine 920 at every appliance 650 in the overlay network can be in communication with the orchestrator 710, which manages all the appliances at a given enterprise. For example, if an enterprise has multiple network appliances deployed in various locations of its WAN, information from all of the inference engines at each appliance can be aggregated over the enterprise and be maintained by one or more data structures (such as a database) at the orchestrator 710 to provide more data points for the distributed deep learning algorithm and perform more accurate classification on the first packet. Furthermore, machine learning can be used at the orchestrator 710 to combine information received from the network appliances in the network.

In addition, a user such as a network administrator can customize the inference for a particular set of packet information such that flows are classified in a particular manner. In this way, the learning algorithm in a particular network appliance can be informed by data inspected through that one appliance and also by data inspected at other appliances throughout the enterprise.

Further, information from multiple enterprise orchestrators can be aggregated in a cloud-based system, along with information from third party databases, to better inform the distributed deep learning algorithm of the neural network and allow each network appliance to perform more accurate classification and inference on the first packet for various flows.

Similarly, information from the cloud intelligence can be communicated to an orchestrator 710, which in turn can be relayed to an appliance 650 at a location. In this way, an inference engine 920 at an appliance at one location can have the benefit of data points from multiple appliances, orchestrators, and third party databases, to aid in its inference. The cloud-based system can also use machine learning techniques applied to the data it receives from different sources. The cloud-based system can determine and evaluate trends across multiple orchestrators (and hence enterprises) and distribute classification and inference information back to each orchestrator 710 and appliance 650, as depicted in FIG. 9.

Figure 10:
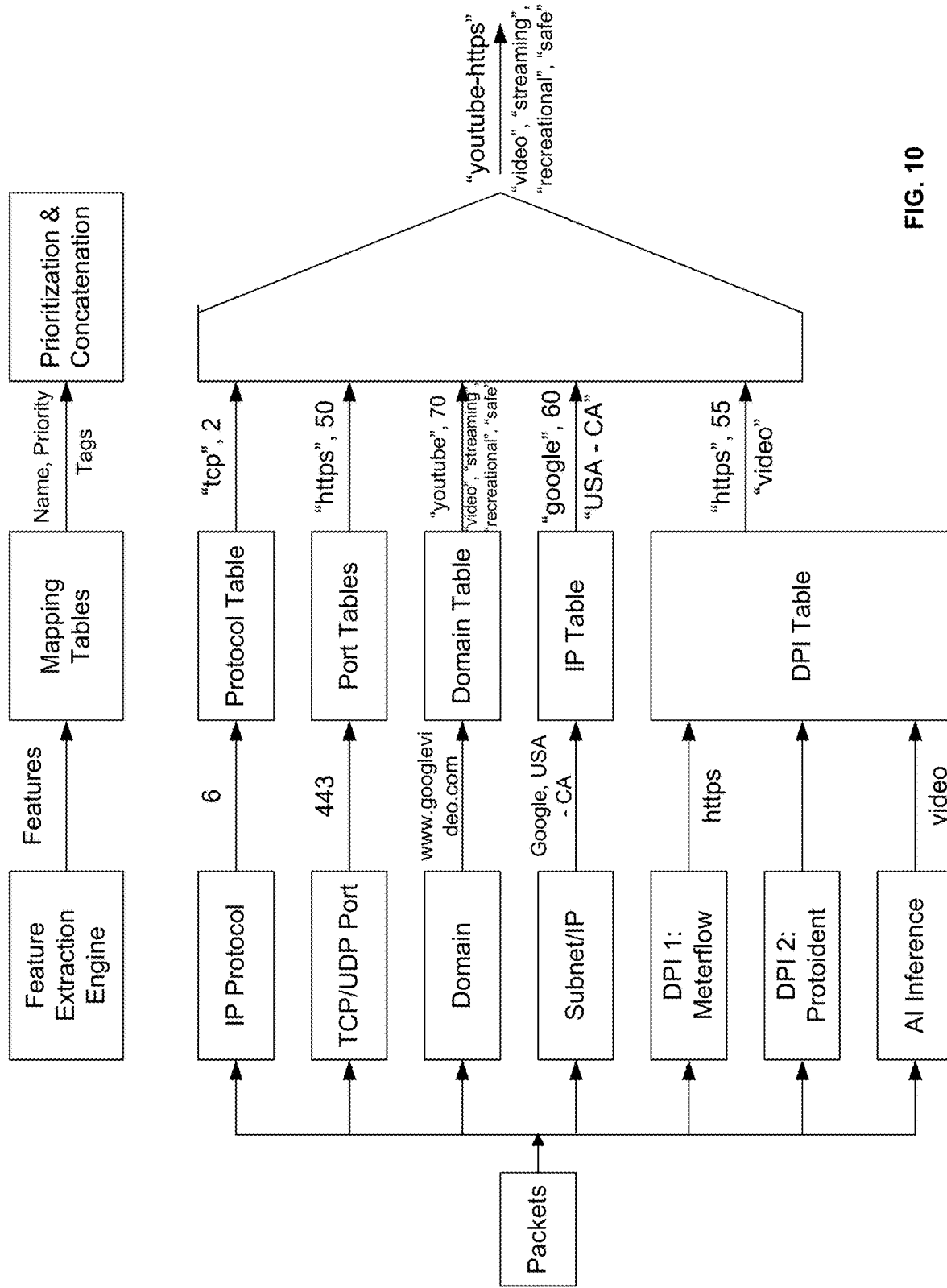
FIG. 10 depicts an exemplary analysis that is conducted on packet information to classify a flow.

FIG. 10 depicts an exemplary analysis that is conducted on packet information to classify a flow. Information from a packet is extracted by a feature extraction engine. The feature extraction engine may extract information such as IP protocol, TCP/UDP port, domain name, subnet/IP, any result from deep packet inspection methods, and an artificial intelligence inference. While these specific features are shown in FIG. 10, a person of ordinary skill in the art would understand that there can be a different set of features or fewer or additional features extracted for any given packet.

A first packet for a flow may only have a few features available, such as IP protocol, TCP/UDP port, and subnet/IP. A subsequent packet for the flow, or combination of subsequent packets, may have one or more additional features that can be extracted, such as an embedded destination domain name. As discussed above, the domain name or other information may span across multiple packets.

From the extracted features, mapping tables are used to map each feature to an application name, priority, and/or one or more tags for the flow. For example, a mapping table may determine that an IP protocol of 6 is for TCP data with a priority of 2. A mapping table may further determine that port number 443 is for https traffic with a priority of 50. A further mapping table may determine that googlevideo.com is for the application name YouTube, which has a priority of 70 and tags of "video", "streaming", "recreational", and "safe".

From these mapped values, the highest priority mapped value may be determined to represent the flow by a prioritization and concatenation engine. In the exemplary embodiment of FIG. 10, the highest priority is 70 and it is indicative of the application "YouTube" with tags of "video", "streaming", "recreational" and "safe". Further, the concatenation engine may also determine that the traffic uses https, and so an application name of "YouTube-https" is determined for the flow. In various embodiments, a characteristic can comprise a key-value pair. For example, "traffic type: video", "business relevance: high", "business relevance: personal".

In various embodiments, the feature extraction process may be performed on a first packet for a flow and/or on one or more subsequent packets for the same flow.

In various embodiments, a domain name and/or subnet can be inferred from an IP address. A DNS table may be consulted with information regarding corresponding domain names and IP addresses. However, since there are many IP addresses in different addressing system, maintaining a local DNS table for every possible IP address is cumbersome. In some embodiments, caching or other similar methods can be used to maintain a subset of DNS information in a location accessible by a network appliance.

In another embodiment, a map can be maintained and distributed from a portal in the orchestrator to all appliances. The map may contain information such as a range of IP addresses or a subnet, the organization/owner of that range, and a geolocation for that range. For example, IP addresses from 0 to X1−1 may correspond to Company A located in San Francisco, Calif. IP addresses from X1 to X2−1 may correspond to Company B located in Chicago, Ill. IP addresses from X2 to X3−1 may correspond to Company C located in Miami, Fla. In this way, a subnet/IP can be inferred from a single IP address.

In a third embodiment, DNS snooping can be used to determine a mapping from a domain name to an IP address. A DNS server may be located in the private data center, at the application 235, or at any other location in the network. When a user computer, such as the user computing device 210 of FIG. 2, sends a request to the DNS server for the IP address associated with a domain name or website, the DNS server responds with the IP address and domain name. The appliance, such as appliance 220 of FIG. 2, can intercept the DNS response to user computing device 210 and create a cached table such that the information is available for future requests to that domain name. Further, this information can be aggregated across all appliances in the enterprise network and maintained in a central location such as in the orchestrator.

In a fourth embodiment, deep packet inspection methods can be used to determine the domain name. For example, a first packet for a flow may have only header information. However, a fourth packet may have information about the destination domain name in the payload of the packet. Thus, deep packet inspection methods can yield the domain name associated with the destination IP address in the header. This information can be aggregated across all appliances and maintained in a central location such as in the orchestrator.

V. System Setup

Figure 14:
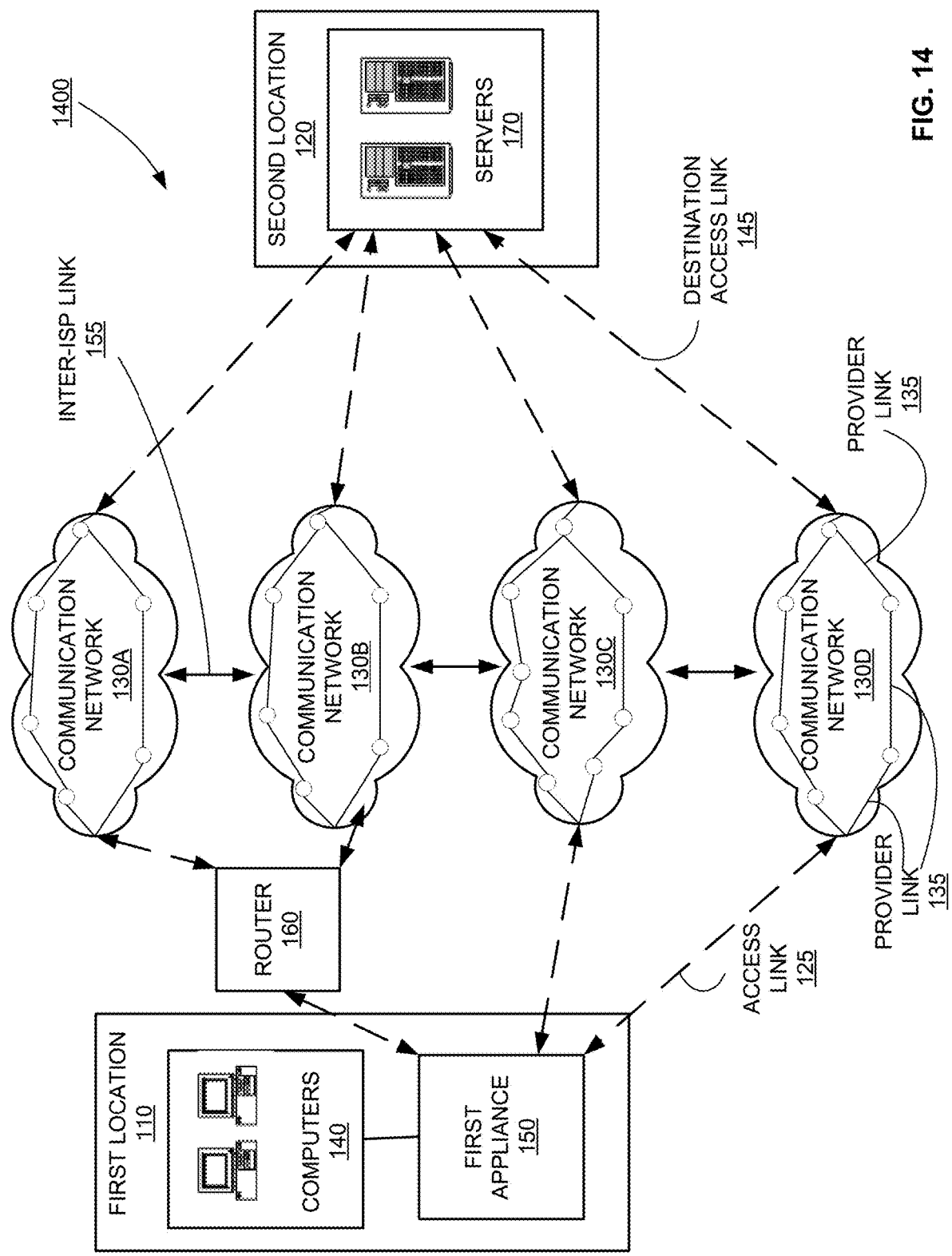
FIG. 14 illustrates an exemplary system within which the present disclosure can be implemented.

FIG. 14 illustrates an exemplary system 1400, within which the present disclosure can be implemented. The exemplary system 1400 includes a first location 110, a second location 120, and communication networks 130A-130D. While four communication networks are depicted in exemplary system 1400, there can be any number of communication networks, including just one. Additionally, system 1400 can include many locations, though only two are depicted in the exemplary figure for simplicity.

In the exemplary embodiment depicted in FIG. 14, the first location 110 includes computers 140 and a first appliance 150. In the first location 110, the computers 140 are linked to the first appliance 150. While only one appliance is depicted in first location 110, there can be multiple appliances, physical and/or virtual, at first location 110. In some embodiments, the first location is a branch location of an enterprise. While not depicted here, first location 110 can also comprise additional elements such as routers, switches, or any other physical or virtual computing equipment.

Computers 140 may be any type of computing device capable of accessing a communication network, such as a desktop computer, laptop computer, server, mobile phone, tablet, or any other "smart" device.

The first appliance 150 comprises hardware and/or software elements configured to receive data and optionally perform any type of processing before transmitting across a communication network.

As illustrated, the first appliance 150 is configured in-line (or serially) between the computers 140 and the router 160. The first appliance 150 intercepts network traffic between the computers 140 and the servers 170, in either direction.

In other embodiments, the first appliance 150 can be configured as an additional router, gateway, bridge, or be transparent on some or all interfaces. As a router, for example, the first appliance 150 appears to the computers 140 as an extra hop before the router 160. In some embodiments, the first appliance 150 provides redundant routing or peer routing with the router 160. Additionally, the first appliance 150 may provide failure mechanisms, such as, fail-to-open (e.g., no data access) or fail-to-wire (e.g., a direct connection to the router 160). If an appliance has multiple interfaces, it can be transparent on some interfaces, or act like a router, or act like a bridge on others. Alternatively, the appliance can be transparent on all interfaces, or appear as a router or bridge on all interfaces.

In FIG. 14, the first appliance 150 is linked to a router 160, which is coupled to communication networks 130A and 130B. While only one router 160 is depicted in exemplary system 1400, there can be multiple routers, switches, or other equipment (physical or virtual) present in system 1400, either within the first location 110 or outside of the first location 110. Typically, router 160 would be located within first location 110. In various embodiments, first appliance 150 may be in communication with communication networks 130C and 130D directly (on separate interfaces), instead of through router 160. While router 160 is depicted as being connected to two communication networks and first appliance 150 is also depicted as being connected to two communication networks, a person of ordinary skill in the art would understand that there can be any number of communication networks (including just one communication network) connected to the first location 110, either via router 160, via first appliance 150, or via another computing device. To illustrate that each of the access links is possible but not required in every embodiment, the access links 125 are shown as dashed lines in FIG. 14.

The second location 120 in exemplary system 1400 includes servers 170. While the term "server" is used herein, any type of computing device may be used in second location 120, as understood by a person of ordinary skill in the art. The server may also be a virtual machine. While not depicted in FIG. 14, second location 120 can optionally include at least one second appliance in addition to, or instead of, servers 170. Second location 120 can also include other components not depicted in FIG. 14, such as routers, switches, load-balancers or any other physical or virtual computing equipment. In some embodiments, the second location 120 is a central location or data center for an enterprise. In other embodiments, the second location 120 is a data center hosting a public web service or application.

The servers 170 are depicted in FIG. 14 as being linked to the communication networks 130A-130D via destination access links 145. In some embodiments, servers 170 may be in communication with the one or more of the communication networks through a router, switch, second appliance, or other physical or virtual equipment. Further, while four destination access links 145 are depicted in FIG. 14, for four communication networks (130A-130D), there may be fewer (such as just one) or more communication networks connected to second location 120. To illustrate that each of the destination access links 145 is possible but not required in every embodiment, the destination access links 145 are shown as dashed lines in FIG. 14.

The communication networks 130A-130D comprise hardware and/or software elements that enable the exchange of information (e.g., voice, video, and data) between the first location 110 and the second location 120. Some examples of the communication networks 130A-130D are a private wide-area network (WAN), the public Internet, Multiprotocol Label Switching (MPLS) network, and wireless LTE network. Typically, connections from the first location 110 to the communication networks 130A-130D (e.g., from router 160 and first appliance 150) are T1 lines (1.544 Mbps), or broadband connections such as digital subscriber lines (DSL) and cable modems. Other examples are MPLS lines, T3 lines (43.232 Mbps), OC3 (155 Mbps), OC48 (2.5 Gbps), fiber optic cables, or LTE wireless access connection. In various embodiments, each of the communication networks 130A-130D may be connected to at least one other communication network via at least one Inter-ISP link 155. For example, communication network 130A may be connected to communication network 130B, 130C, and/or 130D via one or more inter-ISP links. Data may traverse more than one communications network along a path from first location 110 to second location 120. For example, traffic may flow from the first location 110 to communication network 130A, over inter-ISP link 155 to communication network 130B, and then to the second location 120.

The router 160 and first appliance 150 are optionally connected to the communication networks 130A-130D via access links 125, sometimes also referred to herein as network access links. The communication networks 130A-130D consist of routers, switches, and other internal components that make up provider links 135. The provider links 135 are managed by the network service providers such as an Internet Service Provider (ISP). The second location 120 can be connected to communication networks 130A-130D via destination access links 145. Access links 125, provider links 135, and destination access links 145 can be combined to make various network paths along which data travels between the first location 110 and the second location 120. The exemplary embodiment of FIG. 14 depicts two paths along various provider links 135 through each communication network. However, as understood by persons of ordinary skill in the art, there can be any number of network paths across one or more communication networks.

In addition, communication networks may be in communication with one another via inter-ISP link(s) 155. For example, data traveling through communication network 130A may also travel through communication network 130C before reaching second location 120. In various embodiments, data can travel through any one or more of the communication networks 130A-130D from first location 110 to second location 120, and vice versa. Generally, an inter-ISP link connects communication networks of different internet service providers, such as a link connecting Verizon LTE wireless network with Comcast broadband network. In some embodiments, an inter-ISP link can connect communication networks from the same internet service provider, such as a link connecting Verizon LTE wireless network with the Verizon Fire network.

The first appliance 150, along with any other appliances in system 1400 can be physical or virtual. In the exemplary embodiment of a virtual appliance, it can be in a virtual private cloud (VPC), managed by a cloud service provider, such as Amazon Web Services, or others. An appliance in a customer data center can be physical or virtual. Similarly, the second location 120 may be a cloud service such as Amazon Web Service, Salesforce, or others.

As discussed herein, the communication networks 130A-130D can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across an underlay network, regardless of which Service Provider manages the routes or provider links. Data from connected devices can travel over this overlay network, which can consist of any number of tunnels or paths between each location.

In an exemplary embodiment, data from computers 140 at first location 110 may include voice, video, and data. This information can be transmitted by first appliance 150 over one or more communication networks 130A-130D to second location 120. In some embodiments, voice, video, and data may be received and transmitted on separate LAN or vLAN interfaces, and first appliance 150 can distinguish the traffic based on the LAN/vLAN interface at which the data was received.

In some embodiments, the system 1400 includes one or more secure tunnels between the first appliance 150 and servers 170, or optionally a second appliance at the second location. The secure tunnel may be utilized with encryption (e.g., IPsec), access control lists (ACLs), compression (such as header and payload compression), fragmentation/coalescing optimizations, and/or error detection and correction provided by an appliance.

In various embodiments, first location 110 and/or second location 120 can be a branch location, central location, private cloud network, data center, or any other type of location. In addition, multiple locations can be in communication with each other. As understood by persons of ordinary skill in the art, any type of network topology may be used.

The principles discussed herein are equally applicable to multiple first locations (not shown) and to multiple second locations (not shown). For example, the system 1400 may include multiple branch locations and/or multiple central locations coupled to one or more communication networks. System 1400 may also include many sites (first locations) in communication with many different public web services (second locations). Branch location/branch location communication, central location/central location communication, central location/cloud appliance communication, as well as multi-appliance and/or multi-node communication and bi-directional communication are further within the scope of the disclosure. However, for the sake of simplicity, FIG. 14 illustrates the system 1400 having a single first location 110 and a single second location 120.

Figure 6:
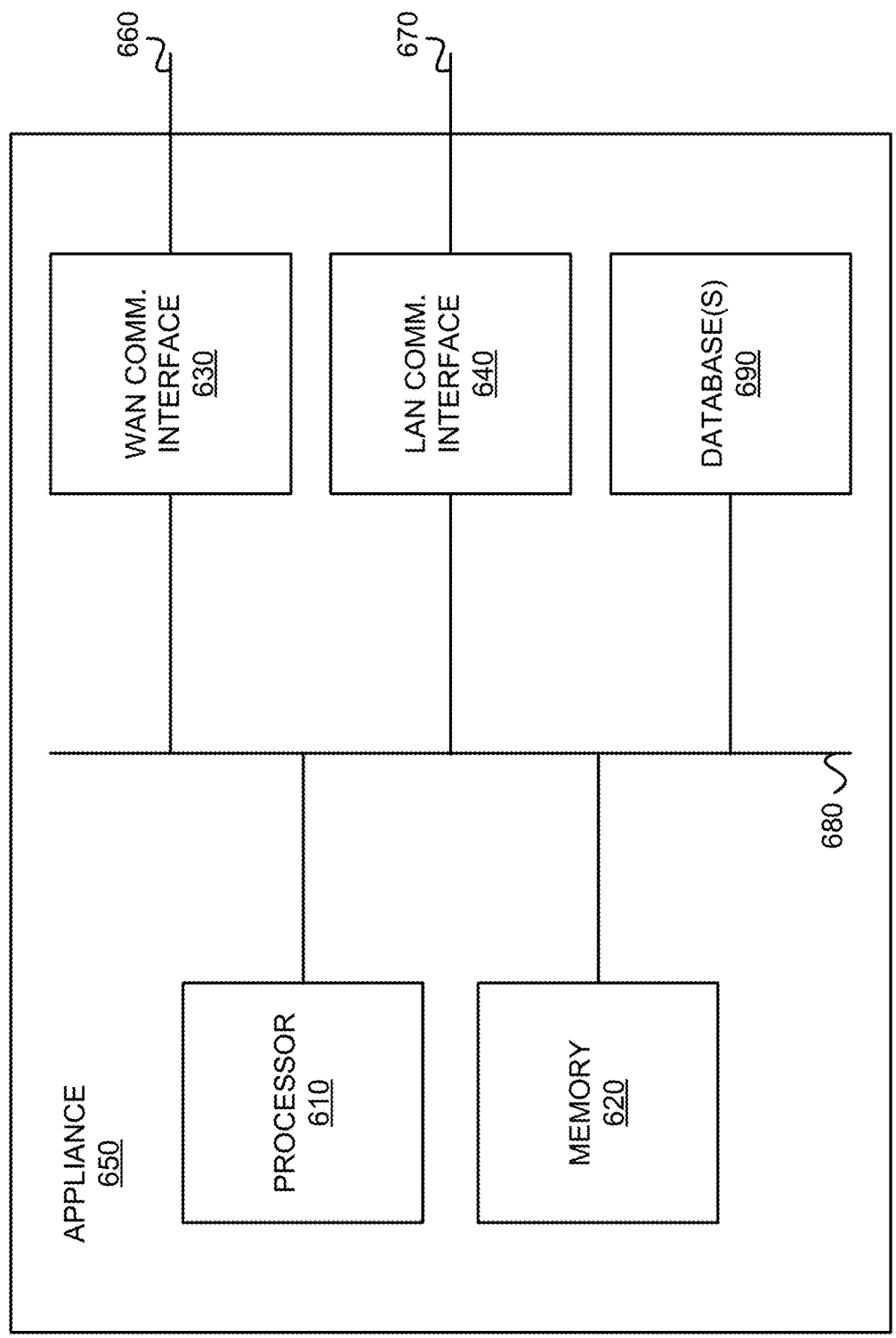
FIG. 6 illustrates a block diagram of an exemplary appliance.

FIG. 6 illustrates a block diagram of an appliance 650 (also referred to herein as network appliance), in an exemplary implementation of the invention. Appliance 650 may be similar to appliance 220 of FIG. 2 and first appliance 150 of FIG. 14, as discussed herein. The appliance 650 includes a processor 610, a memory 620, a WAN communication interface 630, a LAN communication interface 640, and database(s) 690. A system bus 680 links the processor 610, the memory 620, the WAN communication interface 630, the LAN communication interface 640, and the database(s) 690. When deployed in a branch location, line 660 links the WAN communication interface 630 to the router 160 (in FIG. 14), and line 670 links the LAN communication interface 640 to the computers 140 in FIG. 14.

The database(s) 690 comprises hardware and/or software elements configured to store data in an organized format to allow the processor 610 to create, modify, and retrieve the data. The hardware and/or software elements of the database(s) 690 may include storage devices, such as RAM, hard drives, optical drives, flash memory, and magnetic tape.

In some embodiments, some appliances comprise identical hardware and/or software elements. Alternatively, in other embodiments, some appliances, such as a second appliance, may include hardware and/or software elements providing additional processing, communication, and storage capacity.

Embodiments of the present invention also allow for centrally assigned policies to be implemented throughout an organization's entire network, to secure and control all WAN traffic for the organization. Software defined WAN (SD-WAN) overlay networks can be created independently from the physical network, and from each other, and in multiple layers. Topology, security, and forwarding rules can be specified independently for each overlay. This design allows for high-scale and secure application segmentation. Each overlay scales automatically as endpoints are added to the SD-WAN fabric, and configuration integrity is maintained as each site maps a local profile into a global overlay.

Figure 7:
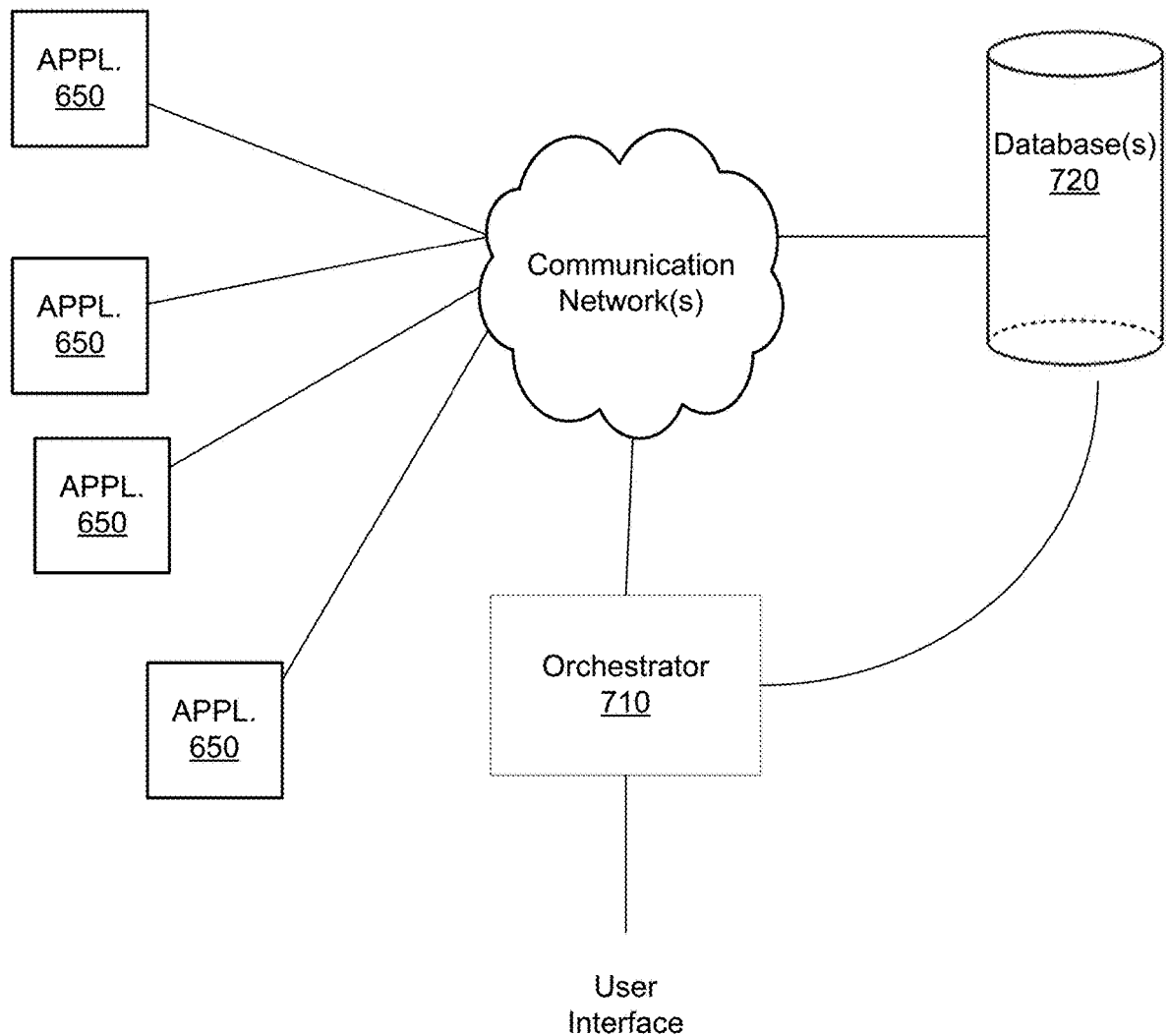
FIG. 7 illustrates an exemplary environment for network appliances.

All the overlay networks, labels, and corresponding ports, subnets and vLANs can be maintained in one or more databases in communication with an orchestrator device, as depicted in FIG. 7. The orchestrator 710 can be hardware and/or software, and be in communication with each of the networked devices, such as the network appliances, as well as in communication with the database(s) 720.

In exemplary embodiments, the orchestrator 710 may maintain information regarding the configuration of each appliance at each location (physical or virtual). In this way, the orchestrator 710 can create, manage, and implement policies for network traffic throughout the network of connected appliances. For example, if a higher priority is designated for voice traffic, the orchestrator 710 can automatically configure the corresponding network appliances at all relevant locations accordingly.

By having knowledge of the configuration of each appliance in the network, the orchestrator 710 can also create and manage tunnels in the enterprise network, including tunnels to carry a particular type of network traffic between each source-destination appliance pair. The orchestrator 710 can automatically configure the enterprise network by determining which tunnels need to be set up, and automatically creating them based on the network nodes and overlays. The orchestrator 710 can also configure policies based on the application classification techniques described herein to preferentially steer certain types of applications over one path rather than over another path.

In exemplary embodiments, network interfaces of a network appliance 650 can be designated on the WAN side and LAN side as processing a specific type of traffic, or traffic from specific applications. For example, a first WAN interface may connect to the public Internet, while a second WAN interface connects to an MPLS service. Both WAN interfaces can support encryption and the Internet uplink can be configured for Network Address Translation (NAT).

Thus, methods and systems for multi-level learning for classifying traffic flows from first packet data are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A system for inferring an application name for a data flow at a network appliance, the system comprising:
   a memory; and
   one or more processors that execute machine readable instructions stored in the memory to:
      extract information from a first packet of the data flow received at the network appliance;
      generate a key representing the extracted information from the first packet of the data flow, the key having a plurality of possible key values;
      track information regarding the network appliance and the plurality of possible key values;
      provide the extracted information and the tracked information to a data structure, the data structure comprising key strings and associated predicted application names, and information extracted from data packets of another flow commencing before the data flow, wherein the data structure is built or updated to influence a learning algorithm for future inferences, and wherein a node of the data structure comprises a total count for a key string, associated application name, and success count for an inferred application name for the key string; and
      using the learning algorithm, predicting the application name associated with the key, wherein the prediction meets or exceeds a level of confidence above a confidence level threshold.

2. The system of claim 1, wherein the learning algorithm is a neural network.

3. The system of claim 1, wherein the extracted information from the first packet comprises at least one of: a source IP address, a destination IP address, source port, destination port, and a protocol.

4. The system of claim 1, wherein the data structure further comprises an application tag associated with a key string of the key strings and a predicted application name of the associated predicted application names.

5. The system of claim 1, wherein the level of confidence above the confidence level threshold is indicative of a known application name with a predetermined level of confidence.

6. The system of claim 5, wherein the predetermined level of confidence is variable, based on at least one of: source IP address, destination IP address, source port, destination port, protocol, and application name.

7. The system of claim 1, wherein the tracked information comprises at least one of: associated source IP address, destination IP address, IP source port, and IP destination port.

8. The system of claim 1, wherein the first packet is a TCP SYN packet.

9. A system for inferring an application tag for a first packet of a data flow at a network appliance, the system comprising:
   a memory; and
   one or more processors that execute machine readable instructions stored in the memory to:
      extract information from a first packet of the data flow received at the network appliance;
      generate a key representing the extracted information from the first packet of the data flow, the key having a plurality of possible key values;
      track information regarding the network appliance and the plurality of possible key values;
      provide the extracted information and the tracked information to a data structure, the data structure comprising key strings and associated predicted application tags, and information extracted from data packets of another flow commencing before the data flow, wherein the data structure is built or updated to influence a learning algorithm for future inferences, and wherein a node of the data structure comprises a total count for a key string, associated application tag, and success count for an inferred application tag for the key string; and
      using the learning algorithm, predicting the application tag associated with the key, wherein the prediction meets or exceeds a level of confidence above a confidence level threshold.

10. The system of claim 9, wherein the learning algorithm is a neural network.

11. The system of claim 9, wherein the extracted information from the first packet comprises at least one of: a source IP address, a destination IP address, source port, destination port, and a protocol.

12. The system of claim 9, wherein the data structure further comprises an application tag associated with a key string of the key strings and a predicted application tag.

13. The system of claim 9, wherein the level of confidence above the confidence level threshold is indicative of a known application tag with a predetermined level of confidence.

14. The system of claim 13, wherein the predetermined level of confidence is variable, based on at least one of: source IP address, destination IP address, source port, destination port, protocol, and application tag.

15. The system of claim 9, wherein the tracked information comprises at least one of: associated source IP address, destination IP address, IP source port, and IP destination port.

16. The system of claim 9, wherein the first packet is a TCP SYN packet.

17. The system of claim 1, the one or more processors further to:
    transforming the key by hashing, wherein the transformed key is compared to the key strings in the data structure.

18. The system of claim 1, wherein the data structure is a hash table comprising the key strings and the associated predicted application names, and the information extracted from the data packets of another flow commencing before the data flow.

\* \* \* \* \*